(12) United States Patent
Fujii et al.

(10) Patent No.: US 11,603,465 B1
(45) Date of Patent: Mar. 14, 2023

(54) THERMOPLASTIC COMPOSITION AND MOLDED ARTICLE THEREOF

(71) Applicant: TECHNO-UMG CO., LTD., Tokyo (JP)

(72) Inventors: Shinji Fujii, Tokyo (JP); Naruki Tanaka, Tokyo (JP)

(73) Assignee: TECHNO-UMG CO., LTD., Tokyo (JP)

(*) Notice: Subject to any disclaimer, the term of this patent is extended or adjusted under 35 U.S.C. 154(b) by 0 days.

(21) Appl. No.: 17/957,459

(22) Filed: Sep. 30, 2022

Related U.S. Application Data

(63) Continuation of application No. 17/790,853, filed as application No. PCT/JP2021/044079 on Dec. 1, 2021.

(30) Foreign Application Priority Data

Mar. 17, 2021 (JP) .............................. JP2021-043780

(51) Int. Cl.
| | | |
|---|---|---|
| C08L 55/02 | (2006.01) | |
| C08F 255/04 | (2006.01) | |
| C08F 212/08 | (2006.01) | |
| C08F 220/44 | (2006.01) | |
| C08G 64/04 | (2006.01) | |
| C08F 236/06 | (2006.01) | |
| C08F 236/08 | (2006.01) | |

(Continued)

(52) U.S. Cl.
CPC .............. *C08L 55/02* (2013.01); *C08F 8/04* (2013.01); *C08F 212/08* (2013.01); *C08F 220/44* (2013.01); *C08F 236/06* (2013.01); *C08F 236/08* (2013.01); *C08F 255/04* (2013.01); *C08G 64/04* (2013.01); *C08J 5/18* (2013.01); *C08L 53/00* (2013.01); *C08G 2350/00* (2013.01); *C08L 2203/30* (2013.01); *C08L 2205/035* (2013.01)

(58) Field of Classification Search
CPC .......... C08L 69/00; C08L 53/02; C08L 51/04; C08L 55/02; C08G 64/04
See application file for complete search history.

(56) References Cited

U.S. PATENT DOCUMENTS

2008/0188580 A1* 8/2008 Sasagawa ................. C08F 8/04
524/68

FOREIGN PATENT DOCUMENTS

| JP | 2009191187 A | * | 8/2009 | |
|---|---|---|---|---|
| JP | 2020186306 A | * | 11/2020 | |
| WO | WO-2015098832 A1 | * | 7/2015 | ............. C08F 255/04 |

* cited by examiner

*Primary Examiner* — Mark S Kaucher
(74) *Attorney, Agent, or Firm* — Manabu Kanesaka

(57) ABSTRACT

A thermoplastic resin composition includes a resin component (A) in an amount of 97 to 80 parts by mass; and a hitting sound reducing material (B) in an amount of 3 to 20 parts by mass. The hitting sound reducing material (B) is a hydrogenated copolymer derived from hydrogenation of a copolymer formed of a block portion (I) primarily including structural units derived from an aromatic vinyl-based compound, and a random portion (II) primarily including structural units derived from an aromatic vinyl-based compound and derived from butadiene. The structural units derived from an aromatic vinyl-based compound in the block portion (I) and derived from an aromatic vinyl-based compound in the random portion (II) are present in a total content of 55 to 80 mass % relative to a 100 total mass % of the copolymer, and the hydrogenated copolymer has a primary dispersion peak of tan δ at 0° C. or greater.

9 Claims, 1 Drawing Sheet

(51) Int. Cl.
*C08F 8/04* (2006.01)
*C08J 5/18* (2006.01)
*C08L 53/00* (2006.01)

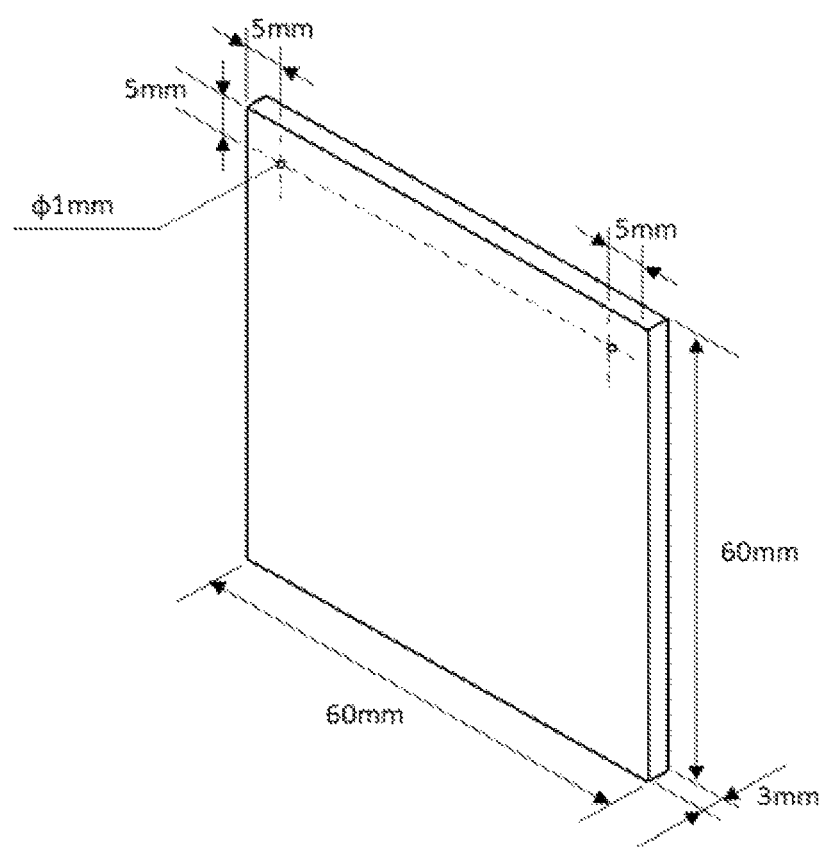

THERMOPLASTIC COMPOSITION AND MOLDED ARTICLE THEREOF

CROSS-REFERENCE TO RELATED APPLICATION

This is a continuation application of application Ser. No. 17/790,853 filed on Jul. 5, 2022, which claims a priority of Japanese Patent Application No. 2021-043780 filed on Mar. 17, 2021, the disclosure of which is incorporated herein.

TECHNICAL FIELD

The present invention relates to a thermoplastic resin composition that can form a molded article that has excellent surface gloss, color properties, surface impact resistance, and rigidity and in which generation of a hitting sound is inhibited. The present invention also relates to a molded article molded from the thermoplastic resin composition.

BACKGROUND ART

Rubber-reinforced resins, such as ABS resins, have excellent mechanical properties, heat resistance, and moldability and are, therefore, widely used as a molding material for vehicle components, such as automotive interior components.

In instances where a vehicle component is molded from a resin, it is required not only to satisfy specified or higher degree of mechanical strengths but also to, for ride comfort in the vehicle, reduce an amount of noise generated by the component, thereby improving the quietness of the vehicle.

One attempt that has been made in the related art involves molding an automotive interior component from a rubber-reinforced resin in which an ethylene-α-olefin-based rubbery polymer is used as a rubber component, thereby preventing squeaks from being generated when components come into contact with each other, while maintaining mechanical strength at a certain level (Patent Literature 1). In the related art, however, inhibition of a noise called a rattle, which is a noise like a hitting sound, has not been achieved.

Another proposal that has been made is to include an elastomeric block polymer in a flame-retardant rubber-reinforced resin to achieve a loss factor at 25° C. at a second resonance frequency of 0.02 or greater so that vibrations can be reduced, thereby providing a flame-retardant resin composition having an excellent vibration damping property (Patent Literature 2 to 4). However, this proposal also does not address inhibiting noise such as a hitting sound.

To solve the problem, still another proposal has been made by the present applicant for providing a thermoplastic resin composition that can form a molded article in which the generation of hitting sounds is inhibited and also in which, preferably, a gloss of the molded article is favorably maintained, and, further preferably, the generation of squeaks is inhibited; the thermoplastic resin composition is formed of at least a rubber-reinforced styrenic thermoplastic resin (A1), which includes, as a rubbery component, a specific thermoplastic elastomer that serves as a hitting sound reducing material; and the thermoplastic resin composition has a loss factor (η) of greater than or equal to a specific value for a frequency range of 20 to 12,400 Hz (Patent Literature 5).

PTL 1: JP 2013-112812 A
PTL 2: JP 2001-158841 A
PTL 3: JP 3-45646 A
PTL 4: JP 8-3249 A
PTL 5: JP 2020-139028 A

Unfortunately, the thermoplastic resin composition of Patent Literature 5 is not sufficiently satisfactory in terms of the appearance of molded articles, such as surface gloss and a color property, and in some cases, the thermoplastic resin composition has poor surface impact resistance, depending on the compounding formula of the resin components.

Regarding the specific thermoplastic elastomer that serves as a hitting sound reducing material, Patent Literature 5 states that "the specific thermoplastic elastomer is a block copolymer or a hydrogenated product thereof; the block copolymer includes a block (I) and a block (II); the block (I) includes structural units derived from an aromatic vinyl-based compound; and the block (II) includes structural units derived from isoprene or from isoprene and butadiene and has a primary dispersion peak of tan δ at 0° C. or greater". However, Patent Literature 5 does not consider proportions of the block (I) and the block (II) and, in addition, provides no specific description of the hydrogenated block copolymer.

In Examples of Patent Literature 5, the specific thermoplastic elastomer that serves as a hitting sound reducing material that was used was a styrene-isoprene-styrene (SIS) block copolymer Hybrar 5127 (trade name, manufactured by Kuraray Co., Ltd., a styrene content of 20%, a glass transition temperature (Tg) of 8° C., a temperature of a primary dispersion peak of tan δ of 25° C., and a 3,4-bond and 1,2-bond content of 95%). That is, in Patent Literature 5, no specific Examples are described in which a hydrogenated block copolymer was used. Furthermore, the styrene content of 20% indicates that a ratio of the block (I)/the block (II) is 20/80, which represents a significantly small proportion of the block (I).

SUMMARY OF INVENTION

An object of the present invention is to provide a thermoplastic resin composition that can form a molded article that has excellent surface gloss, color properties, surface impact resistance, and rigidity and in which generation of a hitting sound is inhibited; this is to be achieved by making improvements over Patent Literature 5 while maintaining its hitting-sound-reducing-effect, the improvements being made to the appearances, such as a color property and gloss, for molded articles and the surface impact resistance.

The present inventor discovered that the above object can be achieved by using a specific hydrogenated copolymer as a hitting sound reducing material.

A summary of the present invention is as follows.

[1] A thermoplastic resin composition comprising:
a resin component (A) in an amount of 97 to 80 parts by mass, the resin component (A) including a rubber-reinforced styrenic thermoplastic resin (A1); and
a hitting sound reducing material (B) in an amount of 3 to 20 parts by mass, wherein
the hitting sound reducing material (B) is a hydrogenated copolymer derived from hydrogenation of a copolymer formed of a block portion (I) and a random portion (II), the block portion (I) primarily including structural units derived from an aromatic vinyl-based compound, the random portion (II) primarily including structural units derived from an aromatic vinyl-based compound and primarily including structural units derived from butadiene,
the structural units derived from an aromatic vinyl-based compound in the block portion (I) and the structural units derived from an aromatic vinyl-based compound in the random portion (II) are present in a total content of 55 to 80 mass % relative to a total mass of the copolymer taken as 100 mass %, and the hydrogenated copolymer has a primary dispersion peak of tan δ at 0° C. or greater.

[2] The thermoplastic resin composition according to [1], wherein the resin component (A) includes the rubber-reinforced styrenic thermoplastic resin (A1) and a styrenic resin (A2).

[3] The thermoplastic resin composition according to [2], wherein the rubber-reinforced styrenic thermoplastic resin (A1) is present in an amount of 0.1 to 99 mass %, and the styrenic resin (A2) is present in an amount of 1 to 99.9 mass %, relative to a mass of the resin component (A) taken as 100 mass %.

[4] The thermoplastic resin composition according to [1], wherein the resin component (A) includes the rubber-reinforced styrenic thermoplastic resin (A1), a styrenic resin (A2), and an aromatic polycarbonate resin (A3).

[5] The thermoplastic resin composition according to [4], wherein the rubber-reinforced styrenic thermoplastic resin (A1) is present in an amount of 0.1 to 89 mass %, the styrenic resin (A2) is present in an amount of 1 to 89.9 mass %, and the aromatic polycarbonate resin (A3) is present in an amount of 10 to 98.9 mass %, relative to a mass of the resin component (A) taken as 100 mass %.

[6] The thermoplastic resin composition according to any one of [1] to [5], wherein the thermoplastic resin composition has a minimum value of a loss factor (η) of greater than or equal to 0.015 for a frequency range of 20 to 12,400 Hz, as measured under condition (1), described below:

<Measurement Condition (1)>

A flat plate having a thickness of 2 mm is molded from the thermoplastic resin composition in an injection molding machine, a test specimen having a length of 250 mm, a width of 10 mm, and a thickness of 2 mm is cut from the flat plate, and a measurement is performed at a temperature of 23° C. on the test specimen with a central exciting method in accordance with specifications of JIS K 7391.

[7] The thermoplastic resin composition according to any one of [1] to [6], wherein the thermoplastic resin composition has a maximum value of a sound pressure of less than or equal to 70 dB for a frequency range of 20 to 20,000 Hz, as measured under condition (2), described below:

<Measurement Condition (2)>

An integrally molded article having a shape that includes a strip-shaped main body and a trapezoidal projection disposed at an upper end of the strip-shaped main body is molded from the thermoplastic resin composition in an injection molding machine, the strip-shaped main body having a length of 120 mm, a width of 60 mm, and a thickness of 3 mm, the trapezoidal projection having an upper base of 20 mm, a lower base of 40 mm, a height of 8 mm, and a thickness of 1.5 mm; the integrally molded article is cut with a universal cutter into a shape having a length of 60 mm, a width of 60 mm, and a thickness of 3 mm; the cut molded article is drilled to have holes having a diameter of 1 mm and serve as a test specimen, the holes being drilled at a position 5 mm from an upper side and 5 mm from a left side and at a position 5 mm from the upper side and 5 mm from a right side, in the cut molded article; in a state in which the test specimen is hung from a kite string passed through the two holes, a middle of a surface of the test specimen is struck with a force of 40±5 N with a stainless steel hammer; a resulting sound is collected with a sound pressure microphone installed 10 cm away from the surface in a perpendicular direction, and a sound pressure-frequency spectrum of the resulting sound is obtained; and a measurement is performed based on the sound pressure-frequency spectrum.

[8] The thermoplastic resin composition according to [7], wherein a frequency that provides the maximum value of the sound pressure is within a range of 20 to 9,000 Hz or a range of 14,000 to 19,000 Hz.

[9] The thermoplastic resin composition according to any one of [1] to [8], wherein the thermoplastic resin composition has an abnormal noise risk value of less than or equal to 3, as measured by a stick-slip measuring device SSP-02, manufactured by Ziegler-Instruments, and measured under measurement condition (3), described below:

<Measurement Condition (3)>

A first test specimen and a second test specimen are molded from the thermoplastic resin composition in an injection molding machine, the first test specimen having a length of 60 mm, a width of 100 mm, and a thickness of 4 mm, the second test specimen having a length of 50 mm, a width of 25 mm, and a thickness of 4 mm, and a measurement is performed by rubbing a surface of the first test specimen and a surface of the second test specimen against each other three times at an amplitude of 20 mm, in an atmosphere at a temperature of 23° C. and a humidity of 50% RH, under four conditions: a load of 5 N, a load of 40 N, a speed of 1 mm/second, and a speed of 10 mm/second.

[10] The thermoplastic resin composition according to any one of [1] to [9], wherein the thermoplastic resin composition has a lightness L* of less than or equal to 18, as measured under condition (4), described below, and has a gloss of greater than or equal to 90%, as measured under condition (5), described below, where the lightness L* and the gloss are measurements of a test specimen molded from a black thermoplastic resin composition in an injection molding machine, the test specimen has a plate shape with a length of 100 mm, a width of 100 mm, and a thickness of 3 mm, and the black thermoplastic resin composition is derived from mixing of 0.8 parts by mass of carbon black with 100 parts by mass of the thermoplastic resin composition:

<Measurement Condition (4)>

The lightness L* is measured in an SCE mode with a CM-3500d spectrophotometer, manufactured by Konica Minolta Optics, Inc.

<Measurement Condition (5)>

A reflectance (%) of a surface of the test specimen is measured in accordance with JIS K 7105, at an incident angle of 60° and a reflection angle of 60°, with a digital variable angle gloss meter UGV-5D, manufactured by Suga Test Instruments Co., Ltd.

[11] The thermoplastic resin composition according to any one of [1] to [10], wherein the thermoplastic resin composition has a rubber content of 5 to 60 mass %.

[12] A molded article made from the thermoplastic resin composition according to any one of [1] to [11].

Advantageous Effects of Invention

With the present invention, it is possible to provide a molded article that has excellent surface gloss, color properties, surface impact resistance, and rigidity and in which generation of a hitting sound is inhibited.

BRIEF DESCRIPTION OF DRAWINGS

FIG. 1 is a perspective view of a test specimen used in a measurement of a sound pressure in Examples.

DESCRIPTION OF EMBODIMENTS

Embodiments of the present invention will be described in detail below.

In the present invention, "(co)polymerization" means "homopolymerization and/or copolymerization", "(meth)acrylic" means "acrylic and/or methacrylic", and "(meth)acrylate" means "acrylate and/or methacrylate".

A melting point measured in accordance with JIS K 7121-1987 (in this specification, the melting point may be referred to as "Tm") is a value of a peak temperature read from a heat absorption pattern, which is obtained by measuring changes in the absorption of heat, at a constant heating rate of 20° C. per minute, with a differential scanning calorimeter (DSC).

[Thermoplastic Resin Composition] A thermoplastic resin composition of the present invention includes a resin component (A) and a hitting sound reducing material (B). The resin component (A) is in an amount of 97 to 80 parts by mass and includes a rubber-reinforced styrenic thermoplastic resin (A1), and the hitting sound reducing material (B) is in an amount of 3 to 20 parts by mass. The hitting sound reducing material (B) is a hydrogenated copolymer derived from hydrogenation of a copolymer formed of a block portion (I) and a random portion (II); the block portion (I) primarily includes structural units derived from an aromatic vinyl-based compound, the random portion (II) primarily includes structural units derived from an aromatic vinyl-based compound and primarily includes structural units derived from butadiene, the structural units derived from an aromatic vinyl-based compound in the block portion (I) and the structural units derived from an aromatic vinyl-based compound in the random portion (II) are present in a total content of 55 to 80 mass % relative to a total mass of the copolymer taken as 100 mass %, and the hydrogenated copolymer has a primary dispersion peak of tan δ at 0° C. or greater (this hydrogenated copolymer may be hereinafter referred to simply as "the hydrogenated copolymer").

[Mechanism]

In the present invention, since the hydrogenated copolymer used as the hitting sound reducing material (B) is hydrogenated, the hydrogenated copolymer has good thermal stability and is unlikely to undergo a crosslinking reaction under the melting and heating conditions during molding. Consequently, molded articles that are produced have excellent surface gloss. In contrast, the thermoplastic elastomer used as the hitting sound reducing material in Patent Literature 5 is not hydrogenated, and, therefore, the thermoplastic elastomer undergoes a crosslinking reaction during molding, which results in the formation of domains having molding shrinkage ratios that are different between crosslinked portions and non-crosslinked portions, which causes the articles being molded to have non-uniform in-plane molding shrinkage; consequently, the molded articles that are produced have poor gloss.

The hydrogenated copolymer used in the present invention has a total content of structural units derived from one or more aromatic vinyl-based compounds of 55 to 80 mass %, that is, the hydrogenated copolymer has a high content of the styrene component. Accordingly, the hydrogenated copolymer has excellent compatibility with the rubber-reinforced styrenic thermoplastic resin (A1) and the like of the resin component (A), with which the hitting sound reducing material (B) is mixed, and, therefore, a morphology in which the hydrogenated copolymer is finely dispersed in the matrix resin can be formed. As a result, the molded articles that are produced have a high color property and high surface impact resistance.

In contrast, the thermoplastic elastomer described in Patent Literature 5 has a styrene content of 20%, which is a low content of the styrene component. Accordingly, dispersibility of the thermoplastic elastomer in the matrix resin is poor, and the resulting color property and surface impact resistance are also poor.

A temperature of a primary dispersion peak of tan δ of the hydrogenated copolymer needs to be 0° C. or greater so that a hitting-sound-reducing-effect can be produced in a room temperature environment.

[Hitting Sound Reducing Material (B)]

The hydrogenated copolymer used as the hitting sound reducing material (B) is a hydrogenated copolymer derived from hydrogenation of a copolymer formed of a block portion (I) and a random portion (II); the block portion (I) primarily includes structural units derived from an aromatic vinyl-based compound, the random portion (II) primarily includes structural units derived from an aromatic vinyl-based compound and primarily includes structural units derived from butadiene, the structural units derived from an aromatic vinyl-based compound in the block portion (I) and the structural units derived from an aromatic vinyl-based compound in the random portion (II) are present in a total content of 55 to 80 mass % relative to a total mass of the copolymer taken as 100 mass %, and the hydrogenated copolymer has a primary dispersion peak of tan δ at 0° C. or greater.

The hydrogenated copolymer may be surface-treated with a coupling agent, such as a silane coupling agent, to be used.

Examples of the aromatic vinyl-based compound that forms the block (I) include styrene, α-methylstyrene, o-methylstyrene, p-methylstyrene, β-methylstyrene, ethylstyrene, p-tert-butylstyrene, vinyl toluene, vinylxylene, and vinyl naphthalene. These compounds may be used alone or in a combination of two or more. Among these, styrene and α-methylstyrene are preferable.

In the block (I), the structural units derived from an aromatic vinyl-based compound are present as a primary component, preferably in an amount greater than or equal to 50 mass % and more preferably in an amount of 80 to 100 mass %.

In instances where the block (I) includes structural units derived from a compound different from an aromatic vinyl-based compound, examples of the different compound include a compound, such as isoprene or butadiene, that forms the random portion (II), described below, and further include vinyl cyanide compounds, such as acrylonitrile.

The random portion (II) is a portion primarily including structural units derived from an aromatic vinyl-based compound and primarily including structural units derived from butadiene.

In the random portion (II), the structural units derived from an aromatic vinyl-based compound and the structural units derived from butadiene are present as primary components, preferably in an amount greater than or equal to 50 mass % and more preferably in an amount of 80 to 100 mass %.

In instances where the random portion (II) includes structural units derived from a compound different from the aromatic vinyl-based compound and butadiene, examples of the different compound include the aromatic vinyl-based compound that forms the block (I), described above, and further include vinyl cyanide compounds, such as acrylonitrile.

The primary dispersion peak of tan δ of the hydrogenated copolymer needs to exist at a temperature of 0° C. or greater. The temperature is preferably 5° C. or greater and more preferably 10° C. or greater.

The primary dispersion peak of tan δ can be determined by performing a measurement with a viscoelasticity measuring device (DDV III EP, manufactured by Toyo Baldwin), at a frequency of 11 Hz, a measurement temperature of −110° C. to +100° C., and a heating rate of 2° C./minute.

A total weight average molecular weight of the hydrogenated copolymer is preferably 30,000 to 400,000, more preferably 40,000 to 370,000, and even more preferably 50,000 to 300,000. The hydrogenated copolymer may have a bimodal molecular weight distribution.

The weight average molecular weights are values measured by gel permeation chromatography (GPC).

In the hydrogenated copolymer used in the present invention, a total content of the structural units derived from an aromatic vinyl-based compound in the block portion (I) and the structural units derived from an aromatic vinyl-based compound in the random portion (II) is 55 to 80 mass % relative to a total mass of the copolymer taken as 100 mass %.

The total content of the structural units derived from an aromatic vinyl-based compound in the block portion (I) and the structural units derived from an aromatic vinyl-based compound in the random portion (II) is preferably 58 to 80 mass % and more preferably 60 to 80 mass %, relative to the total mass of the copolymer taken as 100 mass %. When the content is within any of these ranges, better surface appearances (a color property and gloss) and surface impact resistance are achieved.

The hydrogenated copolymer used as the hitting sound reducing material (B) in the present invention is a hydrogenated product of the copolymer formed of the block portion (I) and the random portion (II), described above. A degree of hydrogenation of the hydrogenated copolymer is preferably greater than or equal to 50% and more preferably 80 to 100%.

[Resin Component (A)]

The thermoplastic resin composition of the present invention includes, as the resin component (A), at least the rubber-reinforced styrenic thermoplastic resin (A1). It is preferable that the thermoplastic resin composition further include a styrenic resin (A2) or include a styrenic resin (A2) and an aromatic polycarbonate resin (A3), together with the rubber-reinforced styrenic thermoplastic resin (A1). The resin component (A) does not include the hydrogenated copolymer that serves as the hitting sound reducing material (B).

<Rubber-Reinforced Styrenic Thermoplastic Resin (A1)>

The rubber-reinforced styrenic thermoplastic resin (A1) is a resin prepared by polymerizing an aromatic vinyl compound or polymerizing an aromatic vinyl compound with a different vinyl monomer (a1) copolymerizable with the aromatic vinyl compound, in the presence of a rubbery polymer (g).

Examples of the rubbery polymer (g) include conjugated diene-based rubbers, such as polybutadiene, polyisoprene, butadiene-styrene copolymers, and butadiene-acrylonitrile copolymers; olefinic rubbers, such as ethylene-propylene copolymers, ethylene-propylene-non-conjugated diene copolymers, ethylene-butene-1 copolymers, and ethylene-butene-1-non-conjugated diene copolymers; acrylic rubbers; silicone rubbers; polyurethane-based rubbers; silicone-acrylic IPN rubbers; natural rubbers; conjugated diene-based block copolymers; and hydrogenated conjugated diene-based block copolymers.

The olefinic rubbers are not particularly limited, and examples thereof include ethylene-α-olefin-based rubbers containing ethylene and an α-olefin having 3 or more carbon atoms. A content of the ethylene is preferably 5 to 95 mass %, more preferably 50 to 90 mass %, and even more preferably 60 to 88 mass %, relative to a total mass of the monomers that form the ethylene-α-olefin-based rubber taken as 100 mass %.

Examples of the α-olefin having 3 or more carbon atoms include propylene, 1-butene, 2-butene, isobutene, 1-pentene, 2-methyl-1-butene, 2-methyl-2-butene, 3-methylbutene, 1-hexene, 4-methyl-1-pentene, 3-methyl-1-pentene, 1-heptene, 1-octene, 1-decene, and 1-undecene. These α-olefins may be present alone or in a combination of two or more. Among these α-olefins, propylene and 1-butene are preferable.

A content of the α-olefin is preferably 95 to 5 mass %, more preferably 50 to 10 mass %, and particularly preferably 40 to 12 mass %, relative to the total mass of the monomers that form the ethylene-α-olefin-based rubber taken as 100 mass %.

The ethylene-α-olefin-based rubber may be a binary copolymer formed of ethylene and an α-olefin or may be a polymer formed of the binary copolymer and one or more other compounds (e.g., a ternary copolymer or a quaternary copolymer). Examples of the one or more other compounds include non-conjugated diene compounds.

Examples of non-conjugated diene compounds that can be used in the olefinic rubbers include alkenyl norbornenes, cyclic dienes, and aliphatic dienes. Dicyclopentadiene and 5-ethylidene-2-norbornene are preferable. These non-conjugated diene compounds may be used alone or in a combination of two or more. A content of the non-conjugated diene compound unit in the ethylene-α-olefin-based rubber is typically less than 30 mass % and preferably less than 15 mass %.

The acrylic rubbers are not particularly limited, and preferred examples thereof include (co)polymers of a (meth)acrylic acid alkyl ester compound in which the alkyl group has 1 to 8 carbon atoms and further include copolymers of the (meth)acrylic acid alkyl ester compound and a vinylic monomer copolymerizable with the (meth)acrylic acid alkyl ester compound.

Specific examples of acrylic acid alkyl ester compounds in which the alkyl group has 1 to 8 carbon atoms include methyl acrylate, ethyl acrylate, propyl acrylate, n-butyl acrylate, i-butyl acrylate, amyl acrylate, hexyl acrylate, n-octyl acrylate, 2-ethylhexyl acrylate, and cyclohexyl acrylate. Specific examples of methacrylic acid alkyl ester compounds include methyl methacrylate, ethyl methacrylate, propyl methacrylate, n-butyl methacrylate, i-butyl methacrylate, amyl methacrylate, hexyl methacrylate, n-octyl methacrylate, 2-ethylhexyl methacrylate, and cyclohexyl methacrylate. Among these compounds, n-butyl acrylate and 2-ethylhexyl acrylate are preferable. These may be used alone or in a combination of two or more.

Examples of the vinylic monomer copolymerizable with the (meth)acrylic acid alkyl ester compound include polyfunctional vinyl compounds, aromatic vinyl compounds, and vinyl cyanide compounds.

The polyfunctional vinyl compounds are monomers having two or more vinyl groups per molecule of the monomer. The polyfunctional vinyl compounds have a function of crosslinking a (meth)acrylic rubber and serve as a reaction initiation site for graft polymerization. Specific examples of polyfunctional vinyl monomers include polyfunctional aromatic vinyl compounds, such as divinylbenzene and divinyltoluene; (meth)acrylic acid esters of a polyhydric alcohol, such as (poly)ethylene glycol dimethacrylate and trimethylolpropane triacrylate; diallyl maleate, diallyl fumarate, triallyl cyanurate, triallyl cyanurate, diallyl phthalate, and allyl methacrylate. These polyfunctional vinyl compounds may be used alone or in a combination of two or more.

The aromatic vinyl compounds and the vinyl cyanide compounds may be any of the compounds mentioned later. Furthermore, examples of other copolymerizable monomers include acrylamides, methacrylamides, vinylidene chloride, alkyl vinyl ethers in which the alkyl group has 1 to 6 carbon atoms, (meth)acrylic acid alkyl esters in which the alkyl group has 9 or more carbon atoms, and (meth)acrylic acids. These are used alone or in a combination of two or more.

A preferred monomer composition of the acrylic rubber is as follows: a (meth)acrylic acid alkyl ester compound unit in which the alkyl group has 1 to 8 carbon atoms is present in an amount of 80 to 99.99 mass % or more preferably 90 to 99.95 mass %, a polyfunctional vinyl compound unit is present in an amount of 0.01 to 5 mass % or more preferably 0.05 to 2.5 mass %, and a different vinyl monomer unit copolymerizable with this is present in an amount of 0 to 20 mass % or more preferably 0 to 10 mass %. The total percentage of the monomer composition is 100 mass %.

A volume average particle diameter of the acrylic rubber is preferably 50 to 1,000 nm, more preferably 40 to 700 nm, and particularly preferably 50 to 500 nm.

Specific examples of the conjugated diene-based block copolymer include copolymers including at least one of block A or block C and including at least one of block B or block A/B; and polymers of block B or block A/B. These blocks are described below. These can be produced with an anionic polymerization method known in the art. Examples of the method include the methods disclosed in JP 47-28915 B, JP 47-3252 B, JP 48-2423 B, and JP 48-20038 B.

Examples of specific structures of the conjugated diene-based block copolymer are listed below. Each of the blocks is defined as follows.

A: aromatic vinyl compound polymer block
B: conjugated diene polymer block
A/B: aromatic vinyl compound/conjugated diene random copolymer block
C: tapered block formed of a copolymer of a conjugated diene and an aromatic vinyl compound, with an amount of the aromatic vinyl compound gradually increasing

A-B (1)

A-B-A (2)

A-B—C (3)

A-B1-B2 (4)

(Here, B1 is a conjugated diene polymer block or a conjugated diene-aromatic vinyl compound copolymer block, with the conjugated diene portion preferably having a vinyl bond content of greater than or equal to 20%, and B2 is a conjugated diene polymer block or a conjugated diene-aromatic vinyl compound copolymer block, with the conjugated diene portion preferably having a vinyl bond content of less than 20%).

A-A/B (5)

A-A/B—C (6)

A-A/B—B (7)

A-A/B-A (8)

B2-B1-B2 (9)

(Here, B1 and B2 are as described above).

C—B (10)

C—B—C (11)

C-A/B—C (12)

C-A-B (13)

The conjugated diene-based block copolymer may be a copolymer in which any of these basic backbones is repeatedly present or may be a conjugated diene-based block copolymer obtained by subjecting the copolymer to coupling. A copolymer having the structure of formula (4) is shown in JP 2-133406 A, and copolymers having the structure of formula (5) or the structure of formula (6) are shown in JP 2-305814 A and JP 3-72512 A.

Examples of the conjugated diene to be used include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene. The conjugated diene may be 1,3-butadiene, isoprene, or 1,3-pentadiene. This is preferable in terms of industrial availability and for obtaining a conjugated diene-based block copolymer having excellent physical properties. More preferably, the conjugated diene is 1,3-butadiene.

Examples of the aromatic vinyl compound to be used include styrene, t-butylstyrene, α-methylstyrene, p-methylstyrene, hydroxystyrene, vinylxylene, monochlorostyrene, dichlorostyrene, monobromostyrene, dibromostyrene, fluorostyrene, p-t-butylstyrene, ethylstyrene, vinyl naphthalene, divinylbenzene, 1,1-diphenylstyrene, N,N-diethyl-p-aminoethylstyrene, N,N-diethyl-p-aminoethylstyrene, and vinylpyridine. Preferably, the aromatic vinyl compound is styrene or α-methylstyrene, and particularly preferably, styrene.

In the conjugated diene-based block copolymer, a ratio of the aromatic vinyl compound/the conjugated diene, on a mass basis, may be 0 to 70/100 to 30. The ratio is preferably 0 to 60/100 to 40 and more preferably 0 to 50/100 to 50. In instances where the aromatic vinyl compound is used as an essential component, the ratio is preferably 10 to 70/90 to 30. If the content of the aromatic vinyl compound is greater than 70 mass %, the copolymer is in the form of a resin. As a result, the effect thereof as the rubber component is poor, and, therefore, such a content is not preferable.

In the conjugated diene block, the vinyl bond content of the conjugated diene portion is typically within a range of 5 to 80%.

A number average molecular weight of the conjugated diene-based block copolymer is typically 10,000 to 1,000,000, preferably 20,000 to 500,000, and more preferably 20,000 to 200,000.

In the above structural formulae, it is preferable that a number average molecular weight of the A portion be within a range of 3,000 to 150,000, and a number average molecular weight of the B portion be within a range of 5,000 to 200,000.

The number average molecular weights are values measured by gel permeation chromatography (GPC).

The vinyl bond content of the conjugated diene compound can be adjusted with one or more substances, examples of which include amines, such as N,N,N',N'-tetramethylethylenediamine, trimethylamine, triethylamine, and diazocyclo(2,2,2)octaamine; ethers, such as tetrahydrofuran, diethylene glycol dimethyl ether, and diethylene glycol dibutyl ether; thioethers; phosphines; phosphoamides; alkyl benzene sulfonic acid salts; and alkoxides of potassium or sodium.

Examples of the coupling agent that is used in the present invention include diethyl adipate, divinylbenzene, methyldichlorosilane, silicon tetrachloride, butyltrichlorosilicon, tetrachlorotin, butyltrichlorotin, dimethylchlorosilicon, tetrachlorogermanium, 1,2-dibromoethane, 1,4-chloromethylbenzene, bis(trichlorosilyl)ethane, epoxidized linseed oils, tolylene diisocyanates, and 1,2,4-benzene triisocyanate.

The hydrogenated conjugated diene-based block copolymer is a hydrogenated product that is a partially hydrogenated product or a completely hydrogenated product of the conjugated diene-based block copolymer, in which at least 30%, or preferably at least 50%, of the carbon-to-carbon double bonds of the conjugated diene portion is hydrogenated, or more preferably at least 90% thereof is hydrogenated.

The hydrogenation reaction of the conjugated diene-based block copolymer can be carried out with a method known in the art. By adjusting the degree of hydrogenation with a method known in the art, a target hydrogenated conjugated diene-based block copolymer can be obtained. Specific examples of the method include the methods disclosed in JP 42-8704 B, JP 43-6636 B, JP 63-4841 B, JP 63-5401 B, JP 2-133406 A, and JP 1-297413 A.

The rubbery polymer (g) used in the present invention may have a gel content of less than or equal to 70 mass %. This is preferable from the standpoint of foamability of a thermoplastic resin composition for foam molding. The gel content is more preferably less than or equal to 50 mass % and even more preferably less than or equal to 10 mass %.

The gel content can be determined according to the method described below.

1 g of the rubbery polymer (g) is added to 100 ml of toluene, which is then allowed to stand at room temperature for 48 hours. Subsequently, a toluene-insoluble residue is filtered off with a 100-mesh wire sieve (a mass of the wire sieve is designated as W1 grams), and then, the toluene-insoluble residue and the wire sieve are dried under vacuum at a temperature of 80° C. for 6 hours and thereafter weighed (the mass is designated as W2 grams). W1 and W2 are substituted into equation (14) below to determine the gel content. Some ethylene-propylene-based rubbery polymers have ethylene crystallinity, and in instances where such a rubbery polymer is used, the rubbery polymer is to be dissolved at a temperature of 80° C. so that the gel content can be determined.

$$\text{Gel content} = [[W2(g) - W1(g)]/1(g)] \times 100 \quad (14)$$

The gel content can be adjusted by appropriately specifying a type and an amount of use of a crosslinkable monomer, a type and an amount of use of a molecular weight regulator, a polymerization time, a polymerization temperature, a polymerization conversion ratio, and the like, for the production of the rubbery polymer (g).

Preferably, the rubbery polymer (g) used in the present invention is polybutadiene, a butadiene-styrene copolymer, an ethylene-propylene copolymer, an ethylene-propylene-non-conjugated diene copolymer, an acrylic rubber, a silicone rubber, a conjugated diene-based block copolymer, or a hydrogenated conjugated diene-based block copolymer. More preferably, the rubbery polymer (g) is an ethylene-propylene copolymer, an ethylene-propylene-non-conjugated diene copolymer, an acrylic rubber, a conjugated diene-based block copolymer, or a hydrogenated conjugated diene-based block copolymer. Particularly preferably, the rubbery polymer (g) is an acrylic rubber, an ethylene-propylene copolymer, an ethylene-propylene-non-conjugated diene copolymer, a conjugated diene-based block copolymer, or a hydrogenated conjugated diene-based block copolymer. Most preferably, the rubbery polymer (g) is an acrylic rubber having a gel content of less than or equal to 10 mass % and a volume average particle diameter of 50 to 500 nm, in particular, 50 to 300 nm.

The rubbery polymer (g) can be produced with a method known in the art, examples of which include emulsion polymerization, solution polymerization, bulk polymerization, and suspension polymerization. Regarding acrylic rubbers, those produced by emulsion polymerization, among these methods, are preferable. Regarding ethylene-propylene copolymers, ethylene-propylene-non-conjugated diene copolymers, conjugated diene-based block copolymers, and hydrogenated conjugated diene-based block copolymers, those produced by solution polymerization are preferable. Regarding polybutadiene and butadiene-styrene copolymers, those produced by solution polymerization are preferable.

The rubber-reinforced styrenic thermoplastic resin (A1) can be obtained by polymerizing an aromatic vinyl compound or polymerizing an aromatic vinyl compound with a different vinyl monomer (a1) copolymerizable with the aromatic vinyl compound, in the presence of the rubbery polymer (g). That is, one or more vinyl monomers (a1) may be an aromatic vinyl compound alone or a mixture of an aromatic vinyl compound and a different vinyl monomer copolymerizable with the aromatic vinyl compound.

It is preferable that the rubber-reinforced styrenic thermoplastic resin (A1) be one obtained by polymerizing an aromatic vinyl compound or polymerizing an aromatic vinyl compound with a different vinyl monomer (a1) copolymerizable with the aromatic vinyl compound, in the presence of the rubbery polymer (g), where the one or more vinyl monomers (a1) is in an amount of 20 to 97 parts by mass, and the rubbery polymer (g) is in an amount of 3 to 80 parts by mass (provided that the sum of the mass of the rubbery polymer (g) and the mass of the one or more vinyl monomers (a1) is 100 parts by mass). More preferably, the proportion of the rubbery polymer (g) is 7 to 65 parts by mass, and the proportion of the one or more vinyl monomers (a1) is 35 to 93 parts by mass.

Examples of the aromatic vinyl compound to be used include all the compounds mentioned above for the rubbery polymer (g). Particularly preferably, the aromatic vinyl compound is styrene or α-methylstyrene. These may be used alone or in a combination of two or more.

Examples of the different vinyl monomer copolymerizable with the aromatic vinyl compound include vinyl cyanide compounds, (meth)acrylic acid ester compounds, maleimide compounds, and other unsaturated compounds containing one or more functional groups. Examples of the other unsaturated compounds containing one or more functional groups include unsaturated acid compounds, epoxy-group-containing unsaturated compounds, hydroxy-group-containing unsaturated compounds, acid-anhydride-group-containing unsaturated compounds, oxazoline-group-containing unsaturated compounds, and substituted or unsubstituted amino-group-containing unsaturated compounds. These different vinyl monomers may be used alone or in a combination of two or more.

Examples of the vinyl cyanide compounds include acrylonitriles and methacrylonitriles. These may be used alone or in a combination of two or more. In the instance where a vinyl cyanide compound is used, chemical resistance is imparted. An amount of use of the vinyl cyanide compound is typically 0 to 60 mass % and preferably 5 to 50 mass %, relative to a total mass of the one or more vinyl monomers (a1).

Examples of the (meth)acrylic acid ester compounds include methyl acrylate, ethyl acrylate, butyl acrylate, methyl methacrylate, ethyl methacrylate, and butyl methacrylate. These may be used alone or in a combination of two or more. In the instance where a (meth)acrylic acid ester compound is used, surface hardness is improved. An amount of use of the (meth)acrylic acid ester compound is typically 0 to 80 mass % relative to the total mass of the one or more vinyl monomers (a1).

Examples of the maleimide compounds include maleimides, N-phenylmaleimide, N-cyclohexylmaleimide, and N-cyclohexylmaleimide. These may be used alone or in a combination of two or more. The introduction of the maleimide unit may be carried out by copolymerizing a maleic anhydride and subsequently performing imidization. In the instance where a maleimide compound is used, heat resistance is imparted. An amount of use of the maleimide compound is typically 1 to 60 mass % relative to the total mass of the one or more vinyl monomers (a1).

Examples of the unsaturated acid compounds include acrylic acid, methacrylic acid, ethacrylic acid, maleic acid, fumaric acid, itaconic acid, crotonic acid, and cinnamic acid. These may be used alone or in a combination of two or more.

Examples of the epoxy-group-containing unsaturated compounds include glycidyl acrylate, glycidyl methacrylate, and allyl glycidyl ether. These may be used alone or in a combination of two or more.

Examples of the hydroxy-group-containing unsaturated compounds include 3-hydroxy-1-propene, 4-hydroxy-1-butene, cis-4-hydroxy-2-butene, trans-4-hydroxy-2-butene, 3-hydroxy-3-methyl-1-propene, 2-hydroxyethyl methacrylate, 2-hydroxyethyl acrylate, and N-(4-hydroxyphenyl)maleimide. These may be used alone or in a combination of two or more.

Examples of the oxazoline-group-containing unsaturated compounds include vinyl oxazoline. These may be used alone or in a combination of two or more.

Examples of the acid-anhydride-group-containing unsaturated compounds include maleic anhydride, itaconic anhydride, and citraconic anhydride. These may be used alone or in a combination of two or more.

Examples of the substituted or unsubstituted amino-group-containing unsaturated compounds include aminoethyl acrylate, propylaminoethyl acrylate, dimethylaminoethyl methacrylate, phenylaminoethyl methacrylate, N-vinyl diethylamine, N-acetyl vinylamine, acrylamine, N-methylacrylamine, acrylamide, N-methylacrylamide, and p-aminostyrene. These may be used alone or in a combination of two or more.

In instances where one or more other unsaturated compounds containing one or more functional groups are used, one possibility is that, for the blending of the rubber-reinforced styrenic thermoplastic resin (A1) with the styrenic resin (A2) and the aromatic polycarbonate resin (A3), compatibility between these may be improved. An amount of use of the other unsaturated compounds containing one or more functional groups is typically 0.1 to 20 mass % and preferably 0.1 to 10 mass %, relative to a total mass of the rubber-reinforced styrenic thermoplastic resin (A1) and the styrenic resin (A2). The amount of use is the total amount of unsaturated compounds containing a functional group that are used.

In the one or more vinyl monomers (a1), an amount of use of one or more monomers other than the aromatic vinyl compound is typically less than or equal to 80 mass %, preferably less than or equal to 60 mass %, and even more preferably less than or equal to 50 mass %, relative to the total mass of the one or more vinyl monomers (a1) taken as 100 mass %.

Examples of preferred combinations of monomers that form the one or more vinyl monomers (a1) include styrene alone, styrene/acrylonitrile, styrene/methyl methacrylate, styrene/acrylonitrile/methyl methacrylate, styrene/acrylonitrile/glycidyl methacrylate, styrene/acrylonitrile/2-hydroxyethyl methacrylate, styrene/acrylonitrile/(meth)acrylate, styrene/N-phenylmaleimide, and styrene/methyl methacrylate/cyclohexylmaleimide. Further preferred combinations are styrene alone, styrene/acrylonitrile (=65/45 to 90/10 (mass ratio)), styrene/methyl methacrylate (=80/20 to 20/80 (mass ratio)), and styrene/acrylonitrile/methyl methacrylate (where the styrene content is any amount within a range of 20 to 80 mass %, and a total content of acrylonitrile and methyl methacrylate is any amount within a range of 20 to 80 mass %).

The rubber-reinforced styrenic thermoplastic resin (A1) can be produced with a polymerization method known in the art, examples of which include emulsion polymerization, bulk polymerization, solution polymerization, suspension polymerization, and combinations of any of these. Regarding the polymerization method, in instances where the rubbery polymer (g) is derived from emulsion polymerization, the production of the rubber-reinforced styrenic thermoplastic resin (A1) may also be carried out by emulsion polymerization. In instances where the rubbery polymer (g) is derived from solution polymerization, the production of the rubber-reinforced styrenic thermoplastic resin (A1) is typically and preferably carried out by bulk polymerization, solution polymerization, or suspension polymerization. Even in instances where the rubbery polymer (g) is produced by solution polymerization, the production of the rubber-reinforced styrenic thermoplastic resin (A1) can be carried out by emulsion polymerization, which can be performed by emulsifying the rubbery polymer (g) by using a method known in the art. Even in instances where the rubbery polymer (g) is produced by emulsion polymerization, the production of the rubber-reinforced styrenic thermoplastic resin (A1) can be carried out by bulk polymerization, solution polymerization, or suspension polymerization, which can be performed after the rubbery polymer (g) is coagulated and isolated.

In instances where emulsion polymerization is used for the production, any of the following is used: a polymerization initiator, a chain transfer agent, an emulsifying agent, and the like. All of these may be ones known in the art.

Examples of the polymerization initiator include cumene hydroperoxide, p-menthane hydroperoxide, diisopropylbenzene hydroperoxide, tetramethylbutyl hydroperoxide, tert-butyl hydroperoxide, potassium persulfate, and azobisisobutyronitrile. It is preferable to use a redox system as an auxiliary polymerization initiator, and the redox system may include those that use any of various types of reduction agents, saccharated iron pyrophosphate, sulfoxylate, and the like.

Examples of the chain transfer agent include octyl mercaptans, n-dodecyl mercaptans, t-dodecyl mercaptans, n-hexyl mercaptans, and terpinolenes.

Examples of the emulsifying agent that may be used include alkyl benzene sulfonic acid salts, such as sodium dodecylbenzene sulfonate; aliphatic sulfonic acid salts, such as sodium lauryl sulfate; higher fatty acid salts, such as potassium laurate, potassium stearate, potassium oleate, and potassium palmitate; and rosin acid salts, such as potassium rosinate.

In the emulsion polymerization, the manner of using the rubbery polymer (g) and the one or more vinyl monomers (a1) may be as follows. In the presence of the total amount of the rubbery polymer (g), the one or more vinyl monomers (a1) may be added at one time for polymerization or added in portions or continuously for polymerization. It is also possible to add a portion of the rubbery polymer (g) during the polymerization.

After the emulsion polymerization, the obtained latex is typically coagulated with a coagulating agent. Subsequently, the resultant is washed with water and dried to give a powder of the rubber-reinforced styrenic thermoplastic resin (A1). In this instance, the coagulation may be performed after two or more types of latices of the rubber-reinforced styrenic thermoplastic resin (A1) obtained in the emulsion polymerization are appropriately blended together. The coagulation may be performed after a latex of the styrenic resin (A2) is appropriately blended. Examples of the coagulating agent that may be used include inorganic salts, such as calcium chloride, magnesium sulfate, and magnesium chloride; and acids, such as sulfuric acid, acetic acid, citric acid, and malic acid. It is also possible to obtain a powder of the rubber-reinforced styrenic thermoplastic resin (A1) by atomizing and drying the latex.

In instances where the rubber-reinforced styrenic thermoplastic resin (A1) is produced by solution polymerization, solvents that may be used are inert polymerization solvents that are used in typical radical polymerization. Examples thereof include aromatic hydrocarbons, such as ethyl benzene and toluene; ketones, such as methyl ethyl ketone and acetone; acetonitrile; dimethylformamide; and N-methylpyrrolidone.

The polymerization temperature is typically within a range of 80 to 140° C. and preferably 85 to 120° C. For the polymerization, a polymerization initiator may be used, or the polymerization may be carried out by thermal polymerization without using a polymerization initiator.

Suitable examples of polymerization initiators that may be used include organic peroxides, such as ketone peroxides, dialkyl peroxides, diacyl peroxides, peroxyesters, hydroperoxides, azobisisobutyronitrile, and benzoyl peroxide. In instances where a chain transfer agent is used, examples of chain transfer agents that may be used include mercaptans, terpinolenes, and α-methylstyrene dimers.

In instances where the rubber-reinforced styrenic thermoplastic resin (A1) is produced by bulk polymerization or suspension polymerization, any of the polymerization initiators, chain transfer agents, and the like described above for the solution polymerization may be used.

An amount of residual monomers in the rubber-reinforced styrenic thermoplastic resin (A1) produced by any of the above-mentioned polymerization methods is typically less than or equal to 10,000 ppm and preferably less than or equal to 5,000 ppm.

The rubber-reinforced styrenic thermoplastic resin (A1), which is obtained by polymerizing the one or more vinyl monomers (a1) in the presence of the rubbery polymer (g), includes a copolymer in which the one or more vinyl monomers (a1) is graft-copolymerized with the rubbery polymer (g) and includes a non-grafted component (a (co)polymer of the one or more vinyl monomers (a1)) in which the one or more vinyl monomers (a1) is not grafted with the rubbery polymer (g).

Typically, the rubber-reinforced styrenic thermoplastic resin (A1) has a grafting ratio adjusted to be 5 to 100 mass %. The grafting ratio is preferably 10 to 90 mass %, more preferably 15 to 85 mass %, and particularly preferably 20 to 80%. The grafting ratio can be varied by varying one or more factors, examples of which include the type and the amount of use of the polymerization initiator, the type and the amount of use of the chain transfer agent, the polymerization method, the time of contact between the one or more vinyl monomers (a1) and the rubbery polymer (g) during polymerization, the type of the rubbery polymer (g), and the polymerization temperature.

The grafting ratio can be determined according to equation (15) below.

$$\text{Grafting ratio (mass \%)} = \{(T-S)/S\} \times 100 \qquad (15)$$

In equation (15), T is a mass (g) of an insoluble fraction resulting from an operation performed as follows: 1 g of the rubber-reinforced styrenic thermoplastic resin (A1) is added to 20 ml of acetone, the resultant is shaken with a shaker for 2 hours, and subsequently, the resultant is centrifuged with a centrifuge (rotational speed: 23,000 rpm) for 60 minutes to separate a soluble fraction from the insoluble fraction. S is a mass (g) of the rubbery polymer (g) present in 1 g of the rubber-reinforced styrenic thermoplastic resin (A1).

In instances where an aromatic vinyl compound alone is used as the one or more vinyl monomers (a1), methyl ethyl ketone is to be used instead of acetone for the measurement.

Typically, the acetone-soluble fraction of the rubber-reinforced styrenic thermoplastic resin (A1) has an intrinsic viscosity [η] (measured at 30° C. in methyl ethyl ketone used as a solvent) of 0.15 to 1.2 dl/g. The intrinsic viscosity is preferably 0.2 to 1.0 dl/g and more preferably 0.2 to 0.8 dl/g.

Typically, the particles of the grafted rubbery polymer dispersed in the rubber-reinforced styrenic thermoplastic resin (A1) have an average particle diameter of 50 to 3,000 nm. The average particle diameter is preferably 40 to 2,5000 nm and particularly preferably 50 to 2,000 nm. If the rubber particle diameter is less than 50 nm, it is likely that impact resistance is degraded, and if the rubber particle diameter is greater than 3,000 nm, it is likely that the surface appearances of molded articles are degraded.

The rubber-reinforced styrenic thermoplastic resin (A1) can be prepared to have a transparency. This can be achieved by ensuring that the rubbery polymer (g) that is used and the copolymer of the one or more vinyl monomers (a1) have a substantially equal refractive index and/or ensuring that the particle diameter of the rubbery polymer (g) that is dispersed is substantially less than or equal to a wavelength of visible light (typically less than or equal to 1,500 nm). Such a transparent resin may also be used as the rubber-reinforced styrenic thermoplastic resin (A1) of the present invention.

One rubber-reinforced styrenic thermoplastic resin (A1) may be used alone, or two or more rubber-reinforced styrenic thermoplastic resins (A1) that are different in the copolymer composition, physical properties, and/or the like may be mixed together and used.

[Styrenic Resin (A2)]

The styrenic resin (A2) is a (co)polymer prepared by polymerizing an aromatic vinyl compound or polymerizing an aromatic vinyl compound with a different vinyl monomer (a2) copolymerizable with the aromatic vinyl compound. One or more vinyl monomers (a2) may be an aromatic vinyl compound alone or a mixture of an aromatic vinyl compound and a different vinyl monomer copolymerizable with the aromatic vinyl compound. Examples of the aromatic vinyl compound and the different vinyl monomer copolymerizable with the aromatic vinyl compound that are to be used include all the compounds mentioned above as the one or more vinyl monomers (a1) for the rubber-reinforced styrenic thermoplastic resin (A1). The one or more vinyl monomers (a2) may be the same as or different from the one or more vinyl monomers (a1) described above.

In the one or more vinyl monomers (a2), a content of one or more monomers other than the aromatic vinyl compound is typically less than or equal to 80 mass %, preferably less than or equal to 60 mass %, and even more preferably less than or equal to 50 mass %, relative to a total mass of the one or more vinyl monomers (a2) taken as 100 mass %.

Preferred examples of the styrenic resin (A2) include homopolymers of styrene, styrene-acrylonitrile copolymers, styrene-methyl methacrylate copolymers, styrene-acrylonitrile-methyl methacrylate copolymers, styrene-maleimide compound copolymers, and copolymers of any of the foregoing compounds and any of the functional-group-containing unsaturated compounds mentioned above.

The styrenic resin (A2) can be produced with any of the polymerization methods known in the art, which include emulsion polymerization, bulk polymerization, solution polymerization, suspension polymerization, and a combination of any of these, as described above for the production method for the rubber-reinforced styrenic thermoplastic resin (A1).

One styrenic resin (A2) may be used alone, or two or more styrenic resins (A2) that are different in the copolymer composition, physical properties, and/or the like may be mixed together and used.

[Aromatic Polycarbonate Resin (A3)]

The aromatic polycarbonate resin (A3) may be any of aromatic polycarbonate resins derived from a polymerization method known in the art. Examples of the polymerization method include interfacial polycondensation between a dihydroxy aryl compound and phosgene and transesterification reactions (melt polycondensation) between a dihydroxy aryl compound and a carbonate compound, such as diphenyl carbonate.

Examples of the dihydroxy aryl compound include bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)propane, 2,2-bis(4-hydroxy-3-t-butylphenyl)propane, 2,2-bis(4-hydroxy-3-t-butylphenyl)propane, 1,1-bis(4-hydroxyphenyl)cyclopentane, 1,1-bis(4-hydroxyphenyl)cyclohexane, 4,4'-dihydroxyphenyl ether, 4,4'-dihydroxyphenyl sulfide, 4,4'-dihydroxyphenyl sulfone, 4,4'-dihydroxy-3,3'-dimethyl diphenyl sulfone, hydroquinone, and resorcinol. Further examples include polyorganosiloxanes having hydroxy-aryloxy terminal groups (see U.S. Pat. No. 3,419,634, for example). These may be used alone or in a combination of two or more. Among these, 2,2-bis(4-hydroxyphenyl propane (bisphenol A) is preferable.

A viscosity average molecular weight of the aromatic polycarbonate resin (A3) is preferably 12,000 to 40,000, more preferably 15,000 to 35,000, and particularly preferably 18,000 to 30,000. When the molecular weight is high, the resulting molded articles have a high mechanical strength; however, a decrease in flowability tends to degrade the appearance of the molded articles. The aromatic polycarbonate resin (A3) may be two or more aromatic polycarbonate-based resins having different molecular weights.

Typically, the viscosity average molecular weight of the aromatic polycarbonate resin (A3) can be calculated as follows. A specific viscosity ($\eta$sp) of the aromatic polycarbonate resin (A3) is measured at 20° C. and a concentration of 0.7 g/100 ml (methylene chloride), with the methylene chloride being used as a solvent, and the specific viscosity ($\eta$sp) is substituted into the following equation.

$$\text{Viscosity average molecular weight} = ([\eta] \times 8130)^{1.205}$$

In the equation, $[\eta]=[(\eta sp \times 1.12+1)^{1/2}-1]/0.56C$, where C is the concentration.

[Contents of Rubber-Reinforced Styrenic Thermoplastic Resin (A1) and Styrenic Resin (A2)]

In instances where the resin component (A) of the present invention includes the rubber-reinforced styrenic thermoplastic resin (A1) and the styrenic resin (A2), it is preferable that a content of the rubber-reinforced styrenic thermoplastic resin (A1) be 0.1 to 99 mass %, and a content of the styrenic resin (A2) be 1 to 99.9 mass %, relative to a mass of the resin component (A) taken as 100 mass %.

When the contents are within these ranges, good heat resistance and flowability are exhibited.

Regarding the content proportions of the rubber-reinforced styrenic thermoplastic resin (A1) and the styrenic resin (A2), it is more preferable that the rubber-reinforced styrenic thermoplastic resin (A1) be present in an amount of 1 to 80 mass %, and the styrenic resin (A2) in an amount of 20 to 99 mass %, and it is even more preferable that the rubber-reinforced styrenic thermoplastic resin (A1) be present in an amount of 5 to 60 mass %, and the styrenic resin (A2) in an amount of 40 to 95 mass %.

[Contents of Rubber-Reinforced Styrenic Thermoplastic Resin (A1), Styrenic Resin (A2), and Aromatic Polycarbonate Resin (A3)]

In instances where the resin component (A) of the present invention includes the rubber-reinforced styrenic thermoplastic resin (A1), the styrenic resin (A2), and the aromatic polycarbonate resin (A3), it is preferable that a content of the rubber-reinforced styrenic thermoplastic resin (A1) be 0.1 to 89 mass %, a content of the styrenic resin (A2) be 1 to 89.9 mass %, and a content of the aromatic polycarbonate resin (A3) be 10 to 98.9 mass %, relative to the mass of the resin component (A) taken as 100 mass %.

When the contents are within these ranges, better heat resistance and flowability are exhibited.

Regarding the content proportions of the rubber-reinforced styrenic thermoplastic resin (A1), the styrenic resin (A2), and the aromatic polycarbonate resin (A3), it is more preferable that the rubber-reinforced styrenic thermoplastic resin (A1) be present in an amount of 1 to 60 mass %, and the styrenic resin (A2) in an amount of 5 to 64 mass %, and the aromatic polycarbonate resin (A3) in an amount of 35 to 94 mass %, and it is even more preferable that the rubber-reinforced styrenic thermoplastic resin (A1) be present in an amount of 5 to 50 mass %, the styrenic resin (A2) in an amount of 10 to 55 mass %, and the aromatic polycarbonate resin (A3) in an amount of 40 to 85 mass %.

[Other Resins]

The resin component (A) of the present invention may include one or more other resins different from the rubber-reinforced styrenic thermoplastic resin (A1), the styrenic resin (A2), and the aromatic polycarbonate resin (A3), to an extent that does not compromise the object of the present invention.

Examples of the one or more other resins include polyolefin-based resins, vinyl chloride-based resins, acrylic resins, polyester-based resins, polyamide-based resins, polyacetal-based resins, polyphenylene-ether-based resins, and polyarylene-sulfide-based resins. These thermoplastic resins may be used alone or in a combination of two or more.

In instances where the thermoplastic resin composition of the present invention includes the one or more other resins, it is preferable that a content of the one or more other resins be less than or equal to 50 mass % relative to a mass of the resin component (A), including the rubber-reinforced styrenic thermoplastic resin (A1), the styrenic resin (A2), the aromatic polycarbonate resin (A3), and the one or more other resins, taken as 100 mass %. Particularly preferably, the content is less than or equal to 30 mass %.

[Other Components]

The thermoplastic resin composition of the present invention may include one or more other components different from the resin component (A) and the hitting sound reducing material (B), to an extent that does not compromise the object of the present invention.

[Slidability-Imparting Agent]

The thermoplastic resin composition of the present invention may include a slidability-imparting agent. The slidability-imparting agent imparts slidability to the thermoplastic resin composition, thereby providing an effect of facilitating assembling of a product in which a molded article derived from the thermoplastic resin composition of the present invention is to be included and also providing an effect of inhibiting abnormal noises, such as squeaks, from being generated during use by the product including the molded article.

Representative examples of the slidability-imparting agent include low-molecular-weight oxidized polyethylene, ultra-high-molecular-weight polyethylene, and polytetrafluoroethylene, which are described in JP 2011-137066 A, and also include low-molecular-weight polyolefin waxes (e.g., those having a number average molecular weight of 10,000 or less) and silicone oils.

Preferred examples of the polyethylene waxes include a polyethylene wax having a melting point of 0 to 120° C. In instances where a polyolefin wax having such a melting point or a different additive having a melting point of 0 to 120° C. is added to the thermoplastic resin composition of the present invention, the effect of inhibiting the generation of abnormal noises such as squeaks can be produced even if the rubbery component of the rubber-reinforced styrenic thermoplastic resin (A1) has no melting point (Tm). These slidability-imparting agents may be used alone or in a combination of two or more.

In instances where a slidability-imparting agent is to be included in the thermoplastic resin composition of the present invention, it is preferable that an amount of inclusion of the slidability-imparting agent be 0.1 to 10 parts by mass per 100 parts by mass of the rubber-reinforced styrenic thermoplastic resin (A1).

<Heat Aging Inhibitor>

A heat aging inhibitor may be added to the thermoplastic resin composition of the present invention to obtain molded articles in which the generation of squeaks is inhibited and which have a high degree of surface gloss. The heat aging inhibitor is not particularly limited provided that the heat aging inhibitor is one that is included in rubber or the like. Preferred heat aging inhibitors are phenolic antioxidants and phosphorus-containing antioxidants.

Examples of the phenolic antioxidants include phenolic antioxidants containing a phenol group that has a t-butyl group in an ortho position, as represented by general formula (I) below.

[Chem. 1]

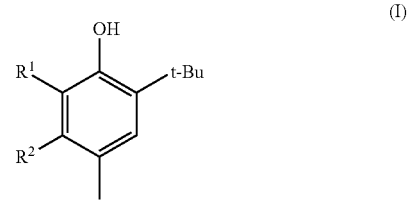

In the formula, $R^1$ and $R^2$ each independently represent a hydrogen atom or an alkyl group having 1 to 8 carbon atoms, and t-Bu represents a t-butyl group.

In general formula (I), preferably, the substituents $R^1$ and $R^2$ each independently represent a hydrogen atom, a t-butyl group, or a methyl group, and more preferably, a hydrogen atom or a methyl group; particularly preferably, $R^1$ is a hydrogen atom. Specifically, the phenolic antioxidant that is used in the present invention is preferably a compound containing one or more groups represented by general formula (I), shown above. More preferably, the phenolic antioxidant is a compound represented by one of the following formulae, (C1), (C2), and (C3).

[Chem. 2]

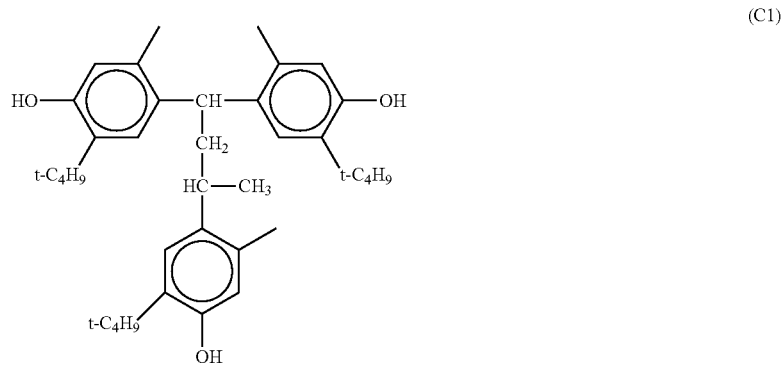

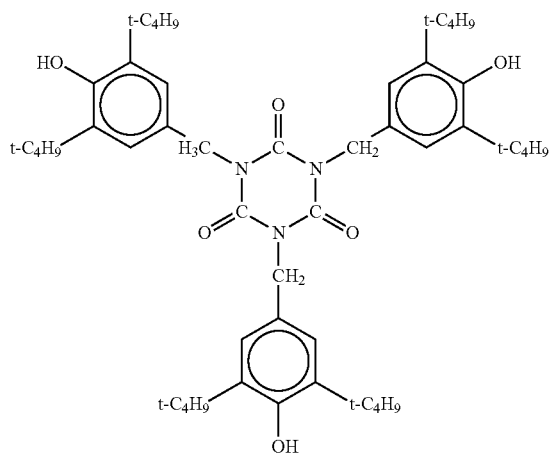

(C2)

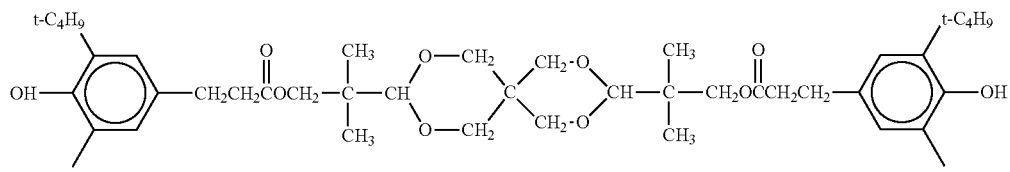

(C3)

Examples of the phosphorus-containing antioxidants include compounds represented by general formula (II) below.

[Chem. 3]

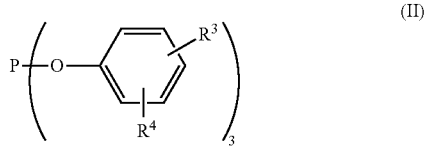

(II)

In the formula, $R^3$ and $R^4$ each independently represent a hydrogen atom or an alkyl group having 1 to 8 carbon atoms, and particularly preferably, $R^3$ and $R^4$ are a t-$C_4H_9$ group.

In instances where a heat aging inhibitor is to be included in the thermoplastic resin composition of the present invention, it is preferable that an amount of inclusion of the heat aging inhibitor be 0.01 to 5 parts by mass per 100 parts by mass of the thermoplastic resin composition of the present invention. More preferably, the amount is 0.02 to 3 parts by mass, even more preferably, 0.03 to 2 parts by mass, and particularly preferably, 0.03 to 1 part by mass. A most preferred range is 0.02 to 0.6 parts by mass, 0.02 to 0.2 parts by mass, 0.03 to 0.6 parts by mass, or 0.03 to 0.2 parts by mass. When the amount of inclusion of the heat aging inhibitor is within any of the above-mentioned ranges, the resulting molded articles have excellent gloss and a good appearance.

<Other Additives>

Examples of other additives that may be included in the thermoplastic resin composition of the present invention include antioxidants, UV absorbers, weathering agents, fillers, antistatic agents, flame-retardancy-imparting agents, antifogging agents, lubricants, antimicrobial agents, antifungal agents, tackifying agents, plasticizing agents, coloring agents, graphite, carbon black, carbon nanotubes, and pigments (including pigments with functionalities imparted thereto, examples of the functionalities including infrared absorption or reflection ability). These may be used alone or in a combination of two or more.

Typically, an amount of inclusion of the one or more additives is 0.1 to 30 parts by mass per 100 parts by mass of the resin component (A).

[Method for Producing Thermoplastic Resin Composition]

The thermoplastic resin composition of the present invention can be produced as follows. The components are mixed together at a predetermined compounding ratio with a tumbler mixer, a Henschel mixer, or the like, and subsequently, the mixture is melt-kneaded under appropriate conditions with a kneading machine, such as a single screw extruder, a twin screw extruder, a Banbury mixer, a kneader, a roller, or a feeder ruder. Preferably, the kneading machine is a twin screw extruder. Furthermore, for the kneading of the components, the components may be kneaded all together, or the components may be added in portions in multiple steps to be kneaded. After the components are kneaded with a Banbury mixer, a kneader, or the like, the resultant may be pelletized with an extruder. A temperature for the melt-kneading is typically 180 to 240° C. and preferably 190 to 230° C.

[Suitable Physical Properties and the Like]

Suitable physical properties and the like of the thermoplastic resin composition of the present invention will be described below. Specifically, the physical properties and the like described below of the thermoplastic resin composition of the present invention are measured with the methods described later in the Examples section.

<Loss Factor ($\eta$)>

The thermoplastic resin composition of the present invention may have a minimum value of a loss factor ($\eta$) of greater than or equal to 0.015 for a frequency range of 20 to 12,400 Hz, as measured under condition (1), described below. Having such a loss factor value is preferable from the standpoint of inhibiting a hitting sound. More preferably, the value is greater than or equal to 0.018.

<Measurement Condition (1)>

A flat plate having a thickness of 2 mm is molded from the thermoplastic resin composition in an injection molding machine, a test specimen having a length of 250 mm, a width of 10 mm, and a thickness of 2 mm is cut from the flat plate, and a measurement is performed at a temperature of 23° C. on the test specimen with a central exciting method in accordance with specifications of JIS K 7391.

<Maximum Value of Sound Pressure>

The thermoplastic resin composition of the present invention may have a maximum value of a sound pressure of less than or equal to 70 dB for a frequency range of 20 to 20,000 Hz, as measured under condition (2), described below. Having such a sound pressure is preferable from the standpoint of inhibiting a hitting sound.

Furthermore, it is preferable that the frequency that provides the maximum value of the sound pressure be within a range of 20 to 9,000 Hz or a range of 14,000 to 19,000 Hz.

It is believed that the more the maximum value of the sound pressure is shifted to the low frequency side of the above-mentioned ranges, the further the intensity of the hitting sound is inhibited.

<Measurement Condition (2)>

An integrally molded article having a shape that includes a strip-shaped main body and a trapezoidal projection disposed at an upper end of the strip-shaped main body is molded from the thermoplastic resin composition in an injection molding machine, the strip-shaped main body having a length of 120 mm, a width of 60 mm, and a thickness of 3 mm, the trapezoidal projection having an upper base of 20 mm, a lower base of 40 mm, a height of 8 mm, and a thickness of 1.5 mm; the integrally molded article is cut with a universal cutter into a shape having a length of 60 mm, a width of 60 mm, and a thickness of 3 mm; the cut molded article is drilled to have holes having a diameter of 1 mm and serve as a test specimen, the holes being drilled at a position 5 mm from an upper side and 5 mm from a left side and at a position 5 mm from the upper side and 5 mm from a right side, in the cut molded article; in a state in which the test specimen is hung from a kite string passed through the two holes, a middle of a surface of the test specimen is struck with a force of 40±5 N with a stainless steel hammer; a resulting sound is collected with a sound pressure microphone installed 10 cm away from the surface in a perpendicular direction, and a sound pressure-frequency spectrum of the resulting sound is obtained; and a measurement is performed based on the sound pressure-frequency spectrum.

<Abnormal Noise Risk Value>

It is preferable that the thermoplastic resin composition of the present invention have an abnormal noise risk value of less than or equal to 3, as measured by a stick-slip measuring device SSP-02, manufactured by Ziegler-Instruments, and measured under measurement condition (3), described below:

<Measurement Condition (3)>

A first test specimen and a second test specimen are molded from the thermoplastic resin composition in an injection molding machine, the first test specimen having a length of 60 mm, a width of 100 mm, and a thickness of 4 mm, the second test specimen having a length of 50 mm, a width of 25 mm, and a thickness of 4 mm, and a measurement is performed by rubbing a surface of the first test specimen and a surface of the second test specimen against each other three times at an amplitude of 20 mm, in an atmosphere at a temperature of 23° C. and a humidity of 50% RH, under four conditions: a load of 5 N, a load of 40 N, a speed of 1 mm/second, and a speed of 10 mm/second.

The abnormal noise risk value is a value representing a risk of generation of stick-slip abnormal noise caused by contact members prepared from the same material in accordance with specifications that conform to the German Association of the Automotive Industry (VDA) standard. The risk is graded on a 10-point scale, and a rating of "pass" is given when the abnormal noise level is less than or equal to 3.

<Rubber Content and Melting Point>

The thermoplastic resin composition of the present invention may have a rubber content of 5 to 60 mass % relative to a total mass of the thermoplastic resin composition taken as 100 mass %. Having such a rubber content is preferable from the standpoint of mechanical properties, such as impact resistance, and acoustic properties, such as those associated with hitting sounds and squeaks.

The thermoplastic resin composition may have crystallinity or contain a component having crystallinity. This is preferable because, in such a case, the effect of inhibiting the generation of squeaks is further enhanced. Specifically, it is preferable that the thermoplastic resin composition of the present invention have a melting point within a range of 0 to 120° C. as measured in accordance with JIS K 7121-1987. The melting point is more preferably within a range of 10 to 90° C. and even more preferably 20 to 80° C.

While the melting point (Tm) can be determined in accordance with JIS K 7121-1987 as stated, the number of peaks in the heat absorption pattern for the range of 0 to 120° C. is not necessarily one and may be two or more. The Tm (melting point) observed within the range of 0 to 120° C. may be derived from the rubber-reinforced styrenic thermoplastic resin (A1), in particular, the rubbery component, or may be derived from the one or more other component described above in association with the rubber-reinforced styrenic thermoplastic resin (A1); the one or more other component may be, for instance, a slidability-imparting agent, such as a low-molecular-weight polyolefin wax having a number average molecular weight of, for example, 10,000 or less.

<Mechanical Physical Properties and Heat Resistance>

It is preferable that the thermoplastic resin composition of the present invention have high mechanical strength. It is preferable that the thermoplastic resin composition of the present invention have a flexural modulus of greater than or equal to 1,600 MPa, a deflection temperature under load (1.8 MPa) of greater than or equal to 70° C., a Rockwell hardness of greater than or equal to 90, a tensile strength of greater than or equal to 35 MPa, and a flexural strength of greater than or equal to 45 MPa.

<Flowability>

In instances where the thermoplastic resin composition of the present invention does not include the aromatic polycarbonate resin (A3) in the resin component (A), it is preferable that the thermoplastic resin composition have an MFR of greater than or equal to 10 g/10 min. In instances where the thermoplastic resin composition of the present invention includes the aromatic polycarbonate resin (A3), it is preferable that the MFR of thermoplastic resin composition be greater than or equal to 14 g/10 min.

<Surface Impact Resistance>

It is preferable that the thermoplastic resin composition of the present invention have a high surface impact property. It is preferable that a mode of fracture of the thermoplastic resin composition of the present invention be a ductile fracture, as determined by evaluation of a test specimen under condition (6), described below.

<Measurement Condition (6)>

A test specimen having a length of 55 mm, a width of 80 mm, and a thickness of 2.5 mm is obtained by molding the thermoplastic resin composition in an injection molding machine, and a measurement is performed by puncturing the test specimen with a high-speed puncture impact tester Hydro-Shot HITS-P10, manufactured by Shimadzu Corporation, the puncturing being performed with a punch diameter of 12.7 mm and a hole diameter of a sample holder of 43.0 mm, at a puncturing test speed of 6.7 m/second and a temperature of 23° C.

<Lightness L* and Gloss>

It is preferable that the thermoplastic resin composition of the present invention have a lightness L* of less than or equal to 18 or, in particular, less than or equal to 16, as measured under condition (4), described below, and have a gloss of greater than or equal to 90% or, in particular, greater than or equal to 95%, as measured under condition (5), described below. Having such a lightness is preferable from the standpoint of a color property. The lightness L* and the gloss are measurements of a test specimen molded from a black thermoplastic resin composition in an injection molding machine. The test specimen has a plate shape with a length of 100 mm, a width of 100 mm, and a thickness of 3 mm. The black thermoplastic resin composition is derived from mixing of 0.8 parts by mass of carbon black with 100 parts by mass of the thermoplastic resin composition.

<Measurement Condition (4)>

The lightness L* is measured in an SCE mode with a CM-3500d spectrophotometer, manufactured by Konica Minolta Optics, Inc.

<Measurement Condition (5)>

A reflectance (%) of a surface of the test specimen is measured in accordance with JIS K 7105, at an incident angle of 60° and a reflection angle of 60°, with a digital variable angle gloss meter UGV-5D, manufactured by Suga Test Instruments Co., Ltd.

[Molded Article]

A molded article of the present invention can be produced by molding the thermoplastic resin composition by using a molding method known in the art, examples of which include injection molding, gas injection molding, press molding, sheet extrusion, vacuum molding, profile extrusion, foam molding, material extrusion and deposition, and selective laser sintering.

The thermoplastic resin composition of the present invention has excellent properties as described above. Molded articles of the present invention, which are molded from the thermoplastic resin composition of the present invention, can be used in vehicle interior and exterior articles. Examples of articles in which the thermoplastic resin composition can be used include vehicle interior articles, such as seat belt buckles, upper boxes, cup holders, door trims, door knobs, door pockets, door linings, pillar garnishes, consoles, console boxes, interior mirrors, sun visors, center panels, ventilators, air conditioners, air conditioner panels, heater control panels, plate-shaped wings, valve shutters, louvers, ducts, meter panels, meter cases, meter visors, instrument panel upper garnishes, instrument panel lower garnishes, A/T indicators, on/off switches (slide portions, slide plates), switch bezels, grille front defrosters, grille side defrosters, lid clusters, masks such as instrument panel lower covers (e.g., mask switches and mask radios), pockets (e.g., pocket decks and pocket cards), steering wheel horn pads, cup holders, switch components, switch boxes, grips such as assist grips, handles, grab handles, exterior components for car navigation, camera covers, camera monitoring systems, head-up displays, rear entertainment systems, glove boxes, glove box ratchets, small article containers, cap ratchets of small article containers or the like, interior mirrors, interior lamps, armrests, speaker grilles, navigation panels, overhead consoles, clock indicators, and SOS switches; vehicle exterior articles, such as front grilles, wheel caps, bumpers, fenders, spoilers, garnishes, door mirrors, radiator grilles, rear combination lamps, head lamps, turn lamps, and grips of outside door handles; exterior members such as a case or a housing for office machines or home appliances, interior members, components disposed near switches, components of movable parts, desk lock components, desk drawers, paper trays for copy machines, lighting apparatuses such as panels, covers, connectors, and the like for linear LED lamps, bulb-shaped LED lamps, bulb-type fluorescent lamps, or ceiling lights, home appliances such as cell phones, tablet computers, rice cookers, refrigerators, microwave ovens, gas cooking appliances, vacuum cleaners, dishwashers, air cleaners, air conditioners, heaters, TV sets, and recorders; office equipment, such as printers, FAX machines, copying machines, personal computers, and projectors; acoustic instruments such as audio devices, organs, and electric pianos, caps for cosmetic containers, and battery cell casings. In particular, the thermoplastic resin composition can be preferably used in vehicle interior articles.

The molded article of the present invention may be formed of one component or two or more components. The molded article is suitable for use as a component of an article including at least two components that may come into contact with each other and may pose a risk of generating a hitting sound when the components come into contact with each other. For example, the present invention can provide an article including at least two components that may come into contact with each other, in which at least one of the components may come into contact with the other of the two components, and the other component has a portion that is at least partially formed of the thermoplastic resin composition of the present invention.

In other words, the present invention can provide an article including at least a first component and a second component that may come into contact with each other, in which a portion of the first component that may come into contact with the second component is at least partially formed of the thermoplastic resin composition of the present invention. In this instance, it is preferable that the entirety of the first component or a portion or the entirety of the portion of the first component that comes into contact with the second component be formed of the thermoplastic resin composition of the present invention.

The second component, with which the first component comes into contact, may be a component molded from the thermoplastic resin composition of the present invention, or the second component may be a component molded from a resin other than the thermoplastic resin composition of the present invention or may be a component made of a different material, such as a metal.

Examples of the resin other than the thermoplastic resin composition of the present invention include rubber-reinforced aromatic vinyl-based resins, such as polypropylene-based resins and ABS resins; acrylic resins, such as polymethylmethacrylate; polycarbonate resins; polycarbonate/ABS alloys; nylon resins; nylon/ABS alloys; PET resins; PET/ABS alloys; PBT/ABS alloys; thermoplastic elastomers; and thermosetting elastomers.

The article including at least a first component and a second component that may come into contact with each other is not particularly limited provided that the first and second components are components that may come into contact with each other as described above. An example of the article is an article in which the first and second components are disposed adjacent to each other with a space therebetween and intermittently come into contact with each other when an external force, such as vibration or an opening/closing operation, is applied. More specifically, the article may be an article in which the two components are fitted to each other with some play therebetween, that is, loosely fitted to each other. The manner in which the two components are fitted to each other is not particularly limited provided that the two components are loosely fitted to each other. For example, the two components may be snap-fitted, threadedly fitted, or engagingly fitted. Examples of such articles include opening/closing components (e.g., caps and doors) having a push-open configuration with a push latch or a magnet latch. More specific examples of such articles include, among vehicle interior articles, opening/closing parts, such as sunglass trays.

EXAMPLES

The present invention will now be described in further detail with reference to examples. The present invention is not limited to the examples described below. In the following description, "parts" and % are on a mass basis unless otherwise specified.
[Ingredients]
In the Examples and Comparative Examples described below, the ingredients used in the production of the thermoplastic resin composition were resin components produced in the following manner and commercial products, which are described below.
[Rubber-Reinforced Styrenic Thermoplastic Resin (A1)]
<Production of ABS Resin (A-1)>
To a polymerization vessel equipped with a stirrer, 280 parts of water, 60 parts (on a solids basis) of polybutadiene latex, which was used as a diene-based rubbery polymer and had a weight average particle diameter of 0.26 m and a gel fraction of 90%, 0.3 parts of sodium formaldehyde sulfoxylate, 0.0025 parts of iron (II) sulfate, and 0.01 parts of disodium ethylenediamine tetraacetate were added, and after deoxygenation, the ingredients were heated to 60° C. with stirring in a nitrogen stream. A mixture of monomers was continuously added dropwise to the resultant, at 60° C. for 5 hours. The monomers were 10 parts of acrylonitrile, 30 parts of styrene, 0.2 parts of t-dodecyl mercaptan, and 0.3 parts of cumene hydroperoxide. After completion of the dropwise addition, the resultant was stirred at a polymerization temperature of 65° C. for 1 hour, subsequently, the polymerization was terminated, and, accordingly, a latex of a graft copolymer was obtained. The degree of polymerization was 98%. Subsequently, 0.2 parts of 2,2'-methylene-bis (4-ethylene-6-t-butylphenol) was added to the obtained latex, which was then coagulated with an addition of calcium chloride. The resultant was subjected to processes of washing, filtration, and drying to give an ABS resin (A1-1), which was in the form of a powder. The obtained ABS resin (A1-1) had a grafting ratio of 40%, and its acetone-soluble fraction had an intrinsic viscosity [η] of 0.38 dl/g.
<Production of AES Resin (A1-2)>
To a 20-L stainless steel autoclave equipped with a ribbon-type stirring blade, an auxiliary agent-continuous adding device, a thermometer, and the like, 22 parts of an ethylene-propylene copolymer (ethylene/propylene=78/22 (%), a Mooney viscosity ($ML_{1+4}$, 100° C.) of 20, a melting point (Tm) of 40° C., and a glass transition temperature (Tg) of −50° C.), which was used as an ethylene-α-olefin-based rubbery polymer, 55 parts of styrene, 23 parts of acrylonitrile, 0.5 parts of t-dodecyl mercaptan, and 110 parts of toluene were added. Thereafter, the contents in the autoclave were stirred at an internal temperature, which was increased to 75° C., for 1 hour to give a homogeneous solution. Subsequently, 0.45 parts of t-butyl peroxyisopropylmonocarbonate was added, and the internal temperature was further increased. After the internal temperature reached 100° C., a polymerization reaction was carried out at a stirring speed of 100 rpm, with the temperature being maintained. When 4 hours had passed since the start of the polymerization reaction, the internal temperature was increased to 120° C., a reaction was carried out for another 2 hours, with the temperature being maintained, and the polymerization reaction was terminated. Subsequently, the internal temperature was reduced to 100° C., and 0.2 parts of octadecyl-3-(3,5-di-t-butyl-4-hydroxyphenol)propionate and 0.02 parts of a dimethyl silicone oil KF-96-100cST (trade name, manufactured by Shin-Etsu Silicones) were added. Subsequently, the reaction mixture was removed from the autoclave, and unreacted residues and the solvent were distilled off by steam distillation. Furthermore, the resultant was degassed by substantially removing the volatile portion with an extruder having a 40 mmφ vent (a cylinder temperature of 220° C. and a degree of vacuum of 760 mmHg). In this manner, the reaction mixture was pelletized. The obtained AES resin (A1-2) had a grafting ratio of 70%, and its acetone-soluble fraction had an intrinsic viscosity [η] of 0.47 dl/g.
[Styrenic Resin (A2)]
<AS Resin (A2-1)>
An AS resin (A2-1) was used, which was an acrylonitrile-styrene copolymer in which the proportions of the acrylonitrile units and the styrene units were 27% and 73%, respectively, an intrinsic viscosity [η] (in methyl ethyl ketone, 30° C.) was 0.47 dl/g, and the glass transition temperature (Tg) was 103° C.).
<Production of Heat-Resistant AS Resin (A2-2)>
To a polymerization vessel equipped with a stirrer, 250 parts of water and 1.0 parts of sodium palmitate were added, and after deoxygenation, the ingredients were heated to 70° C. with stirring in a nitrogen stream. Furthermore, 0.4 parts of sodium formaldehyde sulfoxylate, 0.0025 parts of iron (II) sulfate, and 0.01 parts of disodium ethylenediamine tetraacetate were added. Subsequently, a mixture of monomers was continuously added dropwise at a polymerization temperature of 70° C. for 7 hours. The monomers were 70 parts of α-methylstyrene, 25 parts of acrylonitrile, 5 parts of styrene, 0.5 parts of t-dodecyl mercaptan, and 0.2 parts of cumene hydroperoxide. After completion of the dropwise addition, the mixture was stirred at a polymerization temperature of 75° C. for 1 hour, then, the polymerization was terminated, and, accordingly, a latex of a copolymer was obtained. The degree of polymerization was 99%. Subsequently, the obtained latex was coagulated with an addition of calcium chloride. The resultant was subjected to processes of washing, filtration, and drying to give a heat-resistant AS resin (A2-2), which was in the form of a powder. The intrinsic viscosity [η] of the acetone-soluble fraction of the obtained heat-resistant AS resin (A2-2) was 0.40 dl/g.
[Aromatic Polycarbonate Resin (A3)]
<PC Resin (A3-1)>
A PC resin (A3-1) was used, which was an aromatic polycarbonate resin Novarex 7022J (trade name), manufactured by Mitsubishi Engineering-Plastics Corporation.

[Hitting Sound Reducing Material (B)]

The commercial products listed below were used as the hitting sound reducing material (B).

<Hitting Sound Reducing Material (B-1)>

A hydrogenated product of a styrene-butadiene copolymer S1605, manufactured by Asahi Kasei Corp. (a styrene content of 66%, a glass transition temperature (Tg) of 18° C., a temperature of a primary dispersion peak of tan δ of 17° C., and a degree of hydrogenation of 95%)

<Hitting Sound Reducing Material (B-2)>

A styrene-isoprene-styrene block copolymer Versus, manufactured by Kuraray Co., Ltd. (a styrene content of 20%, a glass transition temperature (Tg) of 8° C., and a temperature of a primary dispersion peak of tan δ of 19° C.)

<Hitting Sound Reducing Material (B-3)>

A hydrogenated product of a styrene-butadiene copolymer S1606, manufactured by Asahi Kasei Corp. (a styrene content of 50%, a glass transition temperature (Tg) of 9° C., and a degree of hydrogenation of 95%)

Examples 1 to 8 and Comparative Examples 1 to 9

[Production of Thermoplastic Resin Composition]

The ingredients shown in Table 1 or Table 2 were mixed together at the compounding ratio shown in the table. Subsequently, the mixture was melt-kneaded at 250° C. with a twin screw extruder (model name: TEX44, The Japan Steel Works, Ltd.) to be pelletized. The following measurements and evaluations were performed on the obtained resin compositions. The results are shown in Table 1 and Table 2 below.

[Evaluation Methods]

<Flexural Modulus (rigidity)>

A measurement was performed in accordance with ISO 178.

<Deflection Temperature Under Load>

A measurement was performed in accordance with ISO 75 under a loading condition of 1.8 MPa.

<Rockwell Hardness>

A measurement was performed in accordance with ISO 2039.

<Tensile Strength>

A measurement was performed in accordance with ISO 527.

<Flexural Strength>

A measurement was performed in accordance with ISO 178.

<Sound Pressure of Hitting Sound>

An integrally molded article having a shape that includes a strip-shaped main body and a trapezoidal projection disposed at an upper end of the strip-shaped main body was molded from each of the thermoplastic resin compositions in an injection molding machine Roboshot α-150iA, manufactured by Fanuc Corporation, the strip-shaped main body having a length of 120 mm, a width of 60 mm, and a thickness of 3 mm, the trapezoidal projection having an upper base of 20 mm, a lower base of 40 mm, a height of 8 mm, and a thickness of 1.5 mm. The injection molding was performed at a cylinder temperature of 240° C., an injection pressure of 150 MPa, and a mold temperature of 60° C. The obtained molded article was cut with a universal cutter into a shape having a length of 60 mm, a width of 60 mm, and a thickness of 3 mm, and the cut molded article was drilled to have holes having a diameter of 1 mm, the holes being drilled with a drill press, at a position 5 mm from an upper side and 5 mm from a left side and at a position 5 mm from the upper side and 5 mm from a right side, in the cut molded article. In this manner, a test specimen as illustrated in FIG. 1 was prepared. A kite string was passed through the two holes of the test specimen, and the test specimen was hung from an H-type stand with clamps and muffs. The clamp was mounted at a height of 28 cm from the bench. Furthermore, the test specimen was mounted at a height of 18 cm, which was a height from the bench to a middle of one surface of the test specimen. In this instance, a distance between the clamps, from which the test specimen was hung, to the upper side of the test specimen was 7 cm. Furthermore, a sound pressure microphone (trade name: 378B02), manufactured by PCB Piezotronics, was installed at a position 10 cm from the position of the middle of the surface of the hung test specimen in a perpendicular direction with respect to the surface of the test specimen. The sound pressure microphone was mounted on an H-type stand with clamps and muffs, in a direction toward the surface of the test specimen. Furthermore, the sound pressure microphone was mounted at a height of 18 cm from the bench. Thereafter, a middle of a surface of the test specimen opposite to the position of the installed microphone was struck with a force of 40±5 N with an impact hammer (trade name: 086E80) manufactured by PCB Piezotronics, which can measure a striking force, and the resulting sounds were collected with the sound pressure microphone and converted into a sound pressure-frequency spectrum with a Fourier transform analyzer (trade name: Multi JOB FFT Analyzer OR34J-4) manufactured by OROS. The maximum value of the sound pressures (dB) and the corresponding frequency (Hz) in the obtained frequency spectrum were used as measured values. Note that the measurement was performed in a room with a room temperature of 23° C.

<Attenuation of Hitting Sound>

An operation similar to that for the measurement of the sound pressure of hitting sounds was performed, and temporal changes in the sound pressure were measured with the Fourier transform analyzer (trade name: Multi JOB FFT Analyzer OR34J-4) manufactured by OROS. The time it took for the sound pressure at the time of the generation of the sound to be reduced to one-quarter of the maximum sound pressure was used as a hitting sound attenuation time. The attenuation of the hitting sound is preferably less than 0.038 seconds and more preferably less than 0.035 seconds.

<Loss Factor>

A flat plate having a thickness of 2 mm was molded in an injection molding machine, a test specimen having a length of 250 mm, a width of 10 mm, and a thickness of 2 mm was cut from the flat plate, and a measurement was performed at a temperature of 23° C. on the test specimen, with a central exciting method in accordance with the specifications of JIS K 7391. The minimum value of the loss factors (11) in a frequency range of 20 to 12,400 Hz was designated as the loss factor.

<MFR>

A melt mass flow rate was measured in accordance with ISO 1133, under conditions including a temperature of 240° C. and a load of 98 N.

<Evaluation of Squeaks (Abnormal Noise Risk Value)>

Each of the thermoplastic resin compositions was injection-molded in an injection molding machine IS-170FA, manufactured by Toshiba Machine Co., Ltd., to form an injection-molded plate having a length of 150 mm, a width of 100 mm, and a thickness of 4 mm. The injection molding was performed at a cylinder temperature of 250° C., an injection pressure of 50 MPa, and a mold temperature of 60° C. A test specimen having a length of 60 mm, a width of 100 mm, and a thickness of 4 mm and a test specimen having a length of 50 mm, a width of 25 mm, and a thickness of 4 mm were cut from the plate with a disc saw. The test specimens were chamfered at end portions with #100 grit sandpaper, and subsequently, small burrs were removed with a utility knife. The two plates, large and small, were used as test specimens.

The two test specimens were aged in an oven at an adjusted temperature of 80° C.±5° C. for 300 hours and then cooled at 25° C. for 24 hours. Subsequently, the large test specimen and the small test specimen were secured to a stick-slip tester SSP-02, manufactured by Ziegler-Instruments, and rubbed against each other three times at an amplitude of 20 mm, in an atmosphere at a temperature of 23° C. and a humidity of 50% RH, under four conditions: a load of 5 N, a load of 40 N, a speed of 1 mm/second, and a speed of 10 mm/second. Abnormal noise risk values resulting from this operation were measured. The value of the condition under which the abnormal noise risk value was a maximum was extracted and designated as the measured value. The larger the abnormal noise risk value, the higher the risk of the generation of squeaks. Abnormal noise risk values of less than or equal to 3 are favorable.

<Surface Impact Resistance>

A test specimen having a length of 55 mm, a width of 80 mm, and a thickness of 2.5 mm was obtained by molding the thermoplastic resin composition in an injection molding machine, and a measurement was performed by puncturing the test specimen with a high-speed puncture impact tester Hydro-Shot HITS-P10, manufactured by Shimadzu Corporation, the puncturing being performed with a punch diameter of 12.7 mm and a hole diameter of a sample holder of 43.0 mm, at a puncturing test speed of 6.7 m/second and a temperature of 23° C. When the mode of fracture of the test specimen resulting from this operation is a ductile fracture, the surface impact property is favorable.

<Lightness L* and Gloss>

100 parts of pellets of each of the thermoplastic resin compositions and 0.8 parts of carbon black were mixed together in a Henschel mixer. The mixture was fed to an extruder heated at 240° C. and kneaded to give black pellets. The black pellets were injection-molded under conditions including a cylinder temperature of 240° C., a mold temperature of 60° C., and an injection rate of 20 g/second, to give a plate-shaped molded body having a length of 100 mm, a width of 100 mm, and a thickness of 3 mm.

(Lightness L*)

The lightness L* of the molded body was measured in an SCE mode, with a spectrophotometer CM-3500d, manufactured by Konica Minolta Optics, Inc. The measured L* was designated as "L* (ma)". Lower L* values indicated higher degrees of blackness, and thus, in such cases, it was determined that the color property was favorable.

The "lightness L*" is the value (L*) of lightness, which is one of the values of the color attributes in the L* a* b* color coordinate system, which is employed in JIS Z 8729.

The "SCE mode" is a method for measuring colors with a spectrophotometer conforming to JIS Z 8722, with the measurement excluding specular reflection by using a light trap.

(Surface Gloss)

A reflectance (%) of a surface of the molded body was measured in accordance with JIS K 7105, at an incident angle of 60° and a reflection angle of 60°, with a digital variable angle gloss meter UGV-5D, manufactured by Suga Test Instruments Co., Ltd. Higher reflectance values indicate better surface appearances.

TABLE 1

|  |  | Comparative Example | | Example | | | | Comparative Example | |
|---|---|---|---|---|---|---|---|---|---|
|  |  | 1 | 2 | 1 | 2 | 3 | 4 | 3 | 4 |
| Ratios of ingredients (parts) | ABS resin (A1-1) | 12 | 12 | 12 | 12 | 12 | 12 | 12 | 12 |
|  | AES resin (A1-2) | 12 | 12 | 12 | 12 | 12 | 12 | 12 | 12 |
|  | AS resin (A1-3) | 31 | 22 | 30 | 26 | 22 | 18 | 26 | 22 |
|  | Heat-resistant AS resin (A2-2) | 45 | 45 | 45 | 45 | 45 | 45 | 45 | 45 |
|  | Hitting sound reducing material (B-1) | 0 | 0 | 1 | 5 | 9 | 13 | 0 | 0 |
|  | Hitting sound reducing material (B-2) | 0 | 9 | 0 | 0 | 0 | 0 | 0 | 0 |
|  | Hitting sound reducing material (B-3) | 0 | 0 | 0 | 0 | 0 | 0 | 5 | 9 |
|  | Total | 100 | 100 | 100 | 100 | 100 | 100 | 100 | 100 |
| Evaluation results | MFR (g/10 min.) | 14 | 19 | 16 | 21 | 25 | 29 | 22 | 25 |
|  | Flexural modulus (MPa) | 2541 | 2058 | 2484 | 2282 | 2080 | 1878 | 2260 | 2030 |
|  | Deflection temperature under load (° C.) | 94 | 93 | 95 | 93 | 92 | 91 | 93 | 93 |
|  | Rockwell hardness | 114 | 100 | 113 | 109 | 104 | 99 | 106 | 101 |
|  | Tensile strength (MPa) | 49 | 42 | 48 | 46 | 43 | 40 | 45 | 42 |
|  | Flexural strength (MPa) | 78 | 65 | 71 | 71 | 65 | 63 | 70 | 63 |
|  | Maximum value of measured sound pressure (dB) | 75 | 67 | 73 | 69 | 67 | 66 | 75 | 75 |
|  | Observed striking force (N) | 38 | 41 | 41 | 39 | 42 | 41 | 42 | 43 |
|  | Frequency that provides maximum value of sound pressure (Hz) | 1700 | 1630 | 1680 | 1640 | 1590 | 1550 | 1630 | 1540 |
|  | Attenuation of hitting sound (s) | 0.040 | 0.020 | 0.035 | 0.030 | 0.020 | 0.010 | 0.040 | 0.040 |

TABLE 1-continued

|  | | Comparative Example | | Example | | | | Comparative Example | |
| --- | --- | --- | --- | --- | --- | --- | --- | --- | --- |
|  | | 1 | 2 | 1 | 2 | 3 | 4 | 3 | 4 |
|  | Loss factor | 0.010 | 0.035 | 0.013 | 0.024 | 0.035 | 0.046 | 0.010 | 0.010 |
|  | Squeaks risk value | 2 | 2 | 2 | 2 | 2 | 2 | — | — |
|  | Lightness (L*) | 15 | 19 | 16 | 16 | 16 | 16 | — | — |
|  | Gloss (%) | 99 | 86 | 97 | 99 | 95 | 97 | — | — |

TABLE 2

|  |  | Comparative Example | | | Example | | | | Comparative Example | |
| --- | --- | --- | --- | --- | --- | --- | --- | --- | --- | --- |
|  |  | 5 | 6 | 7 | 5 | 6 | 7 | 8 | 8 | 9 |
| Ratios of ingredients (parts) | ABS resin (A1-1) | 6.5 | 6.5 | 6.5 | 6.5 | 6.5 | 6.5 | 6.5 | 6.5 | 6.5 |
|  | AES resin (A1-2) | 9 | 9 | 9 | 9 | 9 | 9 | 9 | 9 | 9 |
|  | AS resin (A1-3) | 19.5 | 14.5 | 10.5 | 18.5 | 14.5 | 10.5 | 7.5 | 14.5 | 10.5 |
|  | Heat-resistant AS resin (A2-2) | 0 | 0 | 0 | 0 | 0 | 0 | 0 | 0 | 0 |
|  | PC resin (A3-1) | 65 | 65 | 65 | 65 | 65 | 65 | 65 | 65 | 65 |
|  | Hitting sound reducing material (B-1) | 0 | 0 | 0 | 1 | 5 | 9 | 13 | 0 | 0 |
|  | Hitting sound reducing material (B-2) | 0 | 5 | 9 | 0 | 0 | 0 | 0 | 0 | 0 |
|  | Hitting sound reducing material (B-3) | 0 | 0 | 0 | 0 | 0 | 0 | 0 | 5 | 9 |
|  | Total | 100 | 100 | 100 | 100 | 100 | 100 | 101 | 100 | 100 |
| Evaluation results | MFR (g/10 min.) | 17 | 17 | 18 | 22 | 23 | 24 | 25 | 22 | 23 |
|  | Flexural modulus (MPa) | 2122 | 1893 | 1707 | 2079 | 1917 | 1755 | 1592 | 1900 | 1712 |
|  | Deflection temperature under load (° C.) | 105 | 104 | 103 | 105 | 105 | 104 | 103 | 104 | 103 |
|  | Rockwell hardness | 113 | 105 | 95 | 111 | 105 | 99 | 93 | 103 | 97 |
|  | Tensile strength (MPa) | 50 | 48 | 42 | 49 | 47 | 44 | 42 | 46 | 42 |
|  | Flexural strength (MPa) | 73 | 65 | 59 | 72 | 67 | 62 | 56 | 66 | 60 |
|  | Maximum value of measured sound pressure (dB) | 77 | 70 | 69 | 74 | 70 | 67 | 65 | 77 | 75 |
|  | Observed striking force (N) | 35 | 36 | 41 | 36 | 39 | 36 | 39 | 39 | 39 |
|  | Frequency that provides maximum value of sound pressure (Hz) | 1650 | 1490 | 1450 | 1600 | 1480 | 1440 | 1420 | 1450 | 1360 |
|  | Attenuation of hitting sound (s) | 0.050 | 0.030 | 0.020 | 0.040 | 0.030 | 0.020 | 0.010 | 0.050 | 0.050 |
|  | Loss factor | 0.010 | 0.019 | 0.025 | 0.012 | 0.019 | 0.025 | 0.320 | 0.010 | 0.010 |
|  | Squeaks risk value | 2 | 1 | 3 | 2 | 2 | 1 | 2 | — | — |
|  | Surface impact resistance (23° C.) | Ductile | Ductile | Brittle | Ductile | Ductile | Ductile | Ductile | — | — |
|  | Lightness (L*) | 15 | 19 | 19 | 16 | 16 | 15 | 16 | — | — |
|  | Gloss (%) | 99 | 87 | 88 | 99 | 97 | 100 | 99 | — | — |

From Tables 1 and 2, it is apparent that the thermoplastic resin compositions of Examples 1 to 8, in which a hydrogenated copolymer according to the present invention was included as the hitting sound reducing material (B), had an excellent hitting-sound-attenuating-effect, had a color property and a gloss comparable to those of Comparative Examples 1 and 5, in which no hitting sound reducing material (B) was included, and had a good appearance.

From Table 2, it is apparent that the thermoplastic resin compositions of Examples 5 to 8 had a comparable surface impact resistance or a lower degree of reduction in the surface impact resistance, compared with that of Comparative Example 5, in which no hitting sound reducing material (B) was included.

In contrast, Comparative Examples 2, 6, and 7, in which the hitting sound reducing material (B-2) that is not a hydrogenated copolymer was included, had a large L* value, which indicated a poor color property, and also had a low gloss. In addition, Comparative Example 7, in which the amount of inclusion of the hitting sound reducing material (B-2) was large, had a significantly reduced surface impact resistance.

Comparative Examples 3, 4, 8, and 9, in which the hitting sound reducing material (B-3) that is a hydrogenated copolymer but has a primary dispersion peak of tan δ of less than 0° C. was used, had a hitting-sound-attenuating-effect comparable to those of Comparative Examples 1 and 5, in which no hitting sound reducing material (B) was included; this indicated a failure to produce the effect of the hitting sound reducing material (B).

Although the present invention has been described in detail by way of the specific modes, it is apparent for those skilled in the art that various changes can be made without departing from the spirit and scope of the present invention.

The invention claimed is:

1. A thermoplastic resin composition comprising:
   a resin component (A) in an amount of 97 to 80 parts by mass, the resin component (A) including a rubber-reinforced styrenic thermoplastic resin (A1), a styrenic resin (A2), and an aromatic polycarbonate resin (A3); and
   a hitting sound reducing material (B) in an amount of 3 to 20 parts by mass, wherein
   the hitting sound reducing material (B) is a hydrogenated copolymer derived from hydrogenation of a copolymer formed of a block portion (I) and a random portion (II), the block portion (I) primarily including structural units derived from an aromatic vinyl-based compound, the random portion (II) primarily including structural units derived from an aromatic vinyl-based compound and primarily including structural units derived from butadiene,
   the structural units derived from an aromatic vinyl-based compound in the block portion (I) and the structural units derived from an aromatic vinyl-based compound in the random portion (II) are present in a total content of 55 to 80 mass % relative to a total mass of the copolymer taken as 100 mass %, and
   the hydrogenated copolymer has a primary dispersion peak of tan δ at 0° C. or greater.

2. The thermoplastic resin composition according to claim 1, wherein the rubber-reinforced styrenic thermoplastic resin (A1) is present in an amount of 0.1 to 89 mass %, the styrenic resin (A2) is present in an amount of 1 to 89.9 mass %, and the aromatic polycarbonate resin (A3) is present in an amount of 10 to 98.9 mass %, relative to a mass of the resin component (A) taken as 100 mass %.

3. The thermoplastic resin composition according to claim 1, wherein the thermoplastic resin composition has a minimum value of a loss factor (η) of greater than or equal to 0.015 for a frequency range of 20 to 12,400 Hz, as measured under condition (1), described below:
   <Measurement Condition (1)>
      A flat plate having a thickness of 2 mm is molded from the thermoplastic resin composition in an injection molding machine, a test specimen having a length of 250 mm, a width of 10 mm, and a thickness of 2 mm is cut from the flat plate, and a measurement is performed at a temperature of 23° C. on the test specimen with a central exciting method in accordance with specifications of JIS K 7391.

4. The thermoplastic resin composition according to claim 1, wherein the thermoplastic resin composition has a maximum value of a sound pressure of less than or equal to 70 dB for a frequency range of 20 to 20,000 Hz, as measured under condition (2), described below:
   <Measurement Condition (2)>
      An integrally molded article having a shape that includes a strip-shaped main body and a trapezoidal projection disposed at an upper end of the strip-shaped main body is molded from the thermoplastic resin composition in an injection molding machine, the strip-shaped main body having a length of 120 mm, a width of 60 mm, and a thickness of 3 mm, the trapezoidal projection having an upper base of 20 mm, a lower base of 40 mm, a height of 8 mm, and a thickness of 1.5 mm; the integrally molded article is cut with a universal cutter into a shape having a length of 60 mm, a width of 60 mm, and a thickness of 3 mm; the cut molded article is drilled to have holes having a diameter of 1 mm and serve as a test specimen, the holes being drilled at a position 5 mm from an upper side and 5 mm from a left side and at a position 5 mm from the upper side and 5 mm from a right side, in the cut molded article; in a state in which the test specimen is hung from a kite string passed through the two holes, a middle of a surface of the test specimen is struck with a force of 40±5 N with a stainless steel hammer; a resulting sound is collected with a sound pressure microphone installed 10 cm away from the surface in a perpendicular direction, and a sound pressure-frequency spectrum of the resulting sound is obtained; and a measurement is performed based on the sound pressure-frequency spectrum.

5. The thermoplastic resin composition according to claim 4, wherein a frequency that provides the maximum value of the sound pressure is within a range of 20 to 9,000 Hz or a range of 14,000 to 19,000 Hz.

6. The thermoplastic resin composition according to claim 1, wherein the thermoplastic resin composition has an abnormal noise risk value of less than or equal to 3, as measured by a stick-slip measuring device SSP-02, manufactured by Ziegler-Instruments, and measured under measurement condition (3), described below:
   <Measurement Condition (3)>
      A first test specimen and a second test specimen are molded from the thermoplastic resin composition in an injection molding machine, the first test specimen having a length of 60 mm, a width of 100 mm, and a thickness of 4 mm, the second test specimen having a length of 50 mm, a width of 25 mm, and a thickness of 4 mm, and a measurement is performed by rubbing a surface of the first test specimen and a surface of the second test specimen against each other three times at an amplitude of 20 mm, in an atmosphere at a temperature of 23° C. and a humidity of 50% RH, under four conditions: a load of 5 N, a load of 40 N, a speed of 1 mm/second, and a speed of 10 mm/second.

7. The thermoplastic resin composition according to claim 1, wherein the thermoplastic resin composition has a lightness L* of less than or equal to 18, as measured under condition (4), described below, and has a gloss of greater than or equal to 90%, as measured under condition (5), described below, where the lightness L* and the gloss are measurements of a test specimen molded from a black thermoplastic resin composition in an injection molding machine, the test specimen has a plate shape with a length of 100 mm, a width of 100 mm, and a thickness of 3 mm, and the black thermoplastic resin composition is derived from mixing of 0.8 parts by mass of carbon black with 100 parts by mass of the thermoplastic resin composition:
   <Measurement Condition (4)>
      The lightness L* is measured in an SCE mode with a CM-3500d spectrophotometer, manufactured by Konica Minolta Optics, Inc.
   <Measurement Condition (5)>
      A reflectance (%) of a surface of the test specimen is measured in accordance with JIS K 7105, at an incident angle of 60° and a reflection angle of 60°, with a digital variable angle gloss meter UGV-5D, manufactured by Suga Test Instruments Co., Ltd.

8. The thermoplastic resin composition according to claim 1, wherein the thermoplastic resin composition has a rubber content of 5 to 60 mass %.

9. A molded article made from the thermoplastic resin composition according to claim 1.

* * * * *